United States Patent
Asada et al.

(10) Patent No.: US 6,256,051 B1
(45) Date of Patent: Jul. 3, 2001

(54) ELECTROPHOTOGRAPHIC DEVICE, ELECTROPHOTOGRAPHY, AND PROCESS FOR PREPARING SHEET BEARING TONER IMAGES

(75) Inventors: Hiroyoshi Asada, Kyoto; Yoshihiro Tamura, Otsu; Masahiro Okita, Yokohama; Mitio Yamasaki, Otsu; Yuji Tanaka, Otsu; Hidetoshi Hara, Otsu; Jun Inagaki, Otsu; Junichi Matsumura, Kurita-gun, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 08/727,533

(22) PCT Filed: Feb. 27, 1996

(86) PCT No.: PCT/JP96/00442
 § 371 Date: Dec. 17, 1997
 § 102(e) Date: Dec. 17, 1997

(87) PCT Pub. No.: WO96/27260
 PCT Pub. Date: Sep. 6, 1996

(30) Foreign Application Priority Data

Feb. 27, 1995 (JP) .................................................. 7-038195

(51) Int. Cl.⁷ .............................. B41J 2/385; G03G 13/04
(52) U.S. Cl. ............................................................ 347/131
(58) Field of Search ................................... 347/115, 116, 347/131, 141, 142, 143, 144, 156, 155; 358/448, 456, 457, 458, 459; 399/98, 99, 181, 233, 237, 239, 240, 248, 249, 302

(56) References Cited

U.S. PATENT DOCUMENTS

| | | | |
|---|---|---|---|
| 3,197,558 | 7/1965 | Ernst | 178/6.6 |
| 5,021,831 | * 6/1991 | Tonomoto | 399/99 X |
| 5,099,286 | * 3/1992 | Nishise et al. | 399/302 |
| 5,283,154 | 2/1994 | Stein | 430/301 |
| 5,346,790 | 9/1994 | Sacripante et al. | 430/106 |
| 5,394,232 | * 2/1995 | Tamura et al. | 399/233 |
| 5,473,422 | * 12/1995 | Anzai | 347/115 X |
| 5,701,566 | * 12/1997 | Bisaiji et al. | 399/302 |
| 5,854,882 | * 12/1998 | Wang | 358/456 X |

FOREIGN PATENT DOCUMENTS

| | | |
|---|---|---|
| 0 435 520A2 | 12/1990 | (EP) . |
| 0 546 304A2 | 6/1993 | (EP) . |
| 56-81870 | 7/1981 | (JP) . |
| 2-31562 | 2/1990 | (JP) . |
| 6-70144 | 3/1994 | (JP) . |
| 6-242658 | 9/1994 | (JP) . |
| 91/09489 | 6/1991 | (WO) . |

OTHER PUBLICATIONS

Supplemental European Search Report.
Erwin Widmer et al.'s paper. TAGA, 28–43 (1992) "The Benefits of Frequency Modulation Screening".

* cited by examiner

*Primary Examiner*—Sandra Brase
(74) *Attorney, Agent, or Firm*—Toray Industries, Inc.

(57) ABSTRACT

The present invention can provide an electrophotographic apparatus and electrophotographic method which are less affected by dot gain, can realize smooth gray scale expression, are high in gray scale reproducibility, and are hard to generate moire.

In an embodiment of the present invention, a continuous tone image is binarized by using the frequency modulation screening, to form a latent image free from the generation of moire and high in relative resolution. The latent image thus formed is developed using a liquid developer, to form a thin toner layer, for forming a toner image less in the generation of mechanical and optical dot gain.

42 Claims, 5 Drawing Sheets

ELECTROPHOTOGRAPHIC DEVICE, ELECTROPHOTOGRAPHY, AND PROCESS FOR PREPARING SHEET BEARING TONER IMAGES

TECHNICAL FIELD

The present invention relates to an electrophotographic apparatus and electrophotographic method using a liquid developer or a developer containing an ultrafine particle toner, and a process for preparing a toner image bearing sheet, and particularly relates to an electrophotographic apparatus and electrophotographic method capable of reproducing a continuous tone image as a binary image with high image quality, and a process for preparing a toner image bearing sheet by using said apparatus and method.

BACKGROUND ARTS

When a continues tone image such as a silver salt photo is reproduced by an electrophotographic apparatus or method, the continuous tone image is usually expressed by the area ratio of the toner deposited area (image area) to the toner non-deposited area (background area) in each of very small regions formed on an image receiving sheet such as paper (the rate of the image area to the area of each small region is called the image area rate). The technique of two-dimensionally recording the data of a continuous tone image, as an image of two levels (e.g., ON and OFF) on a latent image bearing member is called image binarization.

For the image binarization, which is also called halftoning, to reproduce the gray scale of a continuous tone image, many methods are proposed. In this technique, continuous gray scale densities are converted, for example, into a geometric distribution of two-value dots.

For halftoning, two major methods are proposed; "amplitude modulation screening method" and "frequency modulation screening method".

In the amplitude modulation screening method, usually the halftone dots are formed in fixed regularly arranged geometric grids. In other words, in this method, in each region with a finite density, the halftone dots are modulated in size to reproduce the corresponding gray scale density, while the dots number is invariable. A typical technique is Fattening type dither technique called dot concentration type technique. FIG. 3($a$) shows an example of its binarization model.

On the other hand, in the frequency modulation screening method, the distance between halftone dots, or the number of halftone dots formed per unit area is mainly modulated to express a continuous tone image. A typical technique is error diffusion technique. FIG. 3($b$) shows an example of its binarization model.

Low resolution printers of $1/12$ mm or more in the minimum dot pitch, especially ink jet printers generally use the frequency modulation screening method. In the amplitude modulation screening method, for example, in the Fattening type dither technique, an entered density value is compared with the threshold consisting of an m×m matrix, and the ON or OFF of each dot (that is, whether or not an image area is formed in the corresponding dot of the matrix) of many halftone dots is decided. Thus, if the gray scale expressibility, i.e., the number of gray scale levels is increased, then the threshold matrix becomes larger. In this case, the pitch of geometric grids as gray scale expression units becomes larger, and the expressibility of the detail is lowered correspondingly. That is, the relative resolution (a high relative resolution means that the minimum pitch of independently formed halftone dots is small; in the amplitude modulation screening method, it refers to a case where the pitch of geometric grids is small) is in a trade-off relation with the gray scale expressibility.

In a low resolution printer, detail reproducibility cannot be enhanced especially due to the trade-off relation.

Accordingly, in a low resolution printer, the frequency modulation screening method such as the error diffusion technique is used since it can enhance the apparent relative resolution (in the frequency modulation screening method, the relative resolution can be evaluated almost in reference to the maximum pitch of formed single dots).

On the other hand, medium resolution printers of $1/15$ mm or less in the minimum pitch of dots, in particular electrophotographic printers have rather adopted the amplitude modulation screening method because of a phenomenon called "dot gain". The dot gain refers to a phenomenon that when the pixels calculated from a resolution, i.e., the halftone dots of an ideal size are formed on the image receiving sheet such as paper, the actually obtained optical density is higher than the ideal optical density to be obtained. For example, when the image area rate on binary image data in a certain region is 50%, the ideal optical density is equal to the central value between that of a region with no dot formed at all (image area rate 0%) and that of a region filled with dots (image area rate 100%) (to be more strict, ideally the average light reflectance or transmission factor of the region is equal to the central value), but the actual optical density may become slightly higher than the ideal value. This is called dot gain. This occurs mainly according to the following principles.

The dot gain in an electrophotographic printer can be roughly classified into (1) mechanical dot gain, (2) optical dot gain and (3) the dot gain attributable to the single dot shape. The mechanical dot gain (1) refers to a phenomenon that when a toner is transferred from a latent image bearing member onto an image receiving sheet such as paper or onto an intermediate transfer member, or from an intermediate transfer medium onto an image receiving sheet, the pressure applied mainly or as an auxiliary means acts to press the toner layer in the thickness direction, to slightly crush the toner layer, for widening the halftone dots.

The optical dot gain (2) refers to a phenomenon that since the toner layer transferred onto paper has a finite thickness, the light incident on the paper surface in the direction inclining to the normal line of paper surface is partially intercepted by the toner layer, to form a shadow, without reaching part of the paper surface intended to be irradiated with the light, thus lowering the average reflectance of light, to raise the observed optical density.

The dot gain attributable to the single dot shape (3) is a phenomenon often observed, for example, with an electrophotographic apparatus of the type to form a latent image on a latent image bearing member by irradiation with a laser beam, etc., in which image areas are formed in the regions irradiated with the beam (white-black mode development type), and refers to a phenomenon that the area of each halftone dot increases since the shape of the corresponding single dot actually formed on the latent image bearing member does not agree with the theoretical shape of each single dot in binary image data. The reason why this occurs is that since the binary image data divide the surface of the latent image bearing member into square matrixes, the data express whether or not toner deposited regions are formed at the square dot positions, while in the actual latent image formation, the shape of the laser beam spot, etc. mostly gives a pattern including the square (for example, a circle with the square inscribed, etc.) to cover each square dot position (when the shape of the beam spot, etc. is not a square, regions of 100% in image area rate cannot be formed without adopting this configuration). Hence, for example, when a minimum circular dot to cover a square dot position is used as a single dot, the actual image area rate of the latent image is about 1.5 times the image area rate on binary data.

The dot gain occurs at the boundary region between an image area with the toner deposited and a background area with no toner deposited, as can be seen from the above mentioned principles. Therefore, as shown in FIG. 3, in the frequency modulation screening method larger in the boundary region than the amplitude modulation screening method, the dot gain becomes larger, and the gray scale reproducibility tends to decline especially in medium to high density regions. This tendency is pointed out also in Erwin Widmer et al.'s paper, TAGA, 28–43 (1992).

In the dry electrophotography, since toner particles large in average particle size are used for development in most cases, the toner layer of the toner image is thick, to especially emphasize the phenomenon of dot gain. Moreover, in the frequency modulation screening method, it is said that in the regions low in image area rate, since the dot pitches are extremely large, the rough feeling called graininess cannot be avoided. For these reasons, electrophotographic apparatuses with a medium to higher resolution have been adopting the amplitude modulation screening method.

However, the amplitude modulation screening method has a serious disadvantage called "moire". This is an undesirable pattern caused when halftone dots are formed on regularly arranged geometric grids in a halftoned image. The moire can be classified into subject moire, color moire, etc., depending on causes.

The subject moire is caused by the geometric interaction between the periodic image area rates in the original image such as an image expressing the texture of a textile fabric and the pattern of said geometric grids.

The color moire is caused by the interference between the binary images of respective colors respectively with the above mentioned periodicity occurring when the binary images of respective colors obtained by converting a color image are overlapped on one image receiving sheet. In particular, the color moire caused when three or more binary images are overlapped is called "rosette" pattern.

Moreover, in the amplitude modulation screening, if the number of gray scale levels is increased, the relative resolution also declines. Consequently, even with an electrophotographic apparatus very high in resolution, it is difficult to obtain a toner image with large number of the gray scale levels and with high relative resolution. In addition, the above mentioned problem of moire could not be solved fundamentally.

DISCLOSURE OF THE INVENTION

A first object of the present invention is to provide an electrophotographic apparatus and electrophotographic method which are less affected by dot gain, are able to realize smooth gray scale expression, and are high in gray scale reproducibility, high in relative resolution and hard to cause moire.

A second object of the present invention is to provide a process for preparing a toner image bearing sheet, using said electrophotographic apparatus and electrophotographic method. The present invention provides an electrophotographic apparatus, comprising image binarization means for converting continuous tone image data into binary image data through the frequency modulation screening method; latent image forming means for forming a latent image on a latent image bearing member based on the binary image data converted by the image binarization means; and developing means for developing the latent image formed by the latent image forming means, with a liquid developer, for forming a toner image.

The present invention also provides an electrophotographic apparatus, as a preferable embodiment of the above, wherein the image binarization means converts the continuous tone image data into the binary image data by keeping the size of each single dot smaller in the regions low in image area rate than in the regions high in image area rate.

The present invention also provides an electrophotographic apparatus, comprising image binarization means for converting continuous tone image data into binary image data through the amplitude modulation screening method in the regions low in image area rate, and on the other hand, through the frequency modulation screening method in the regions high in image area rate; latent image forming means for forming a latent image on a latent image bearing member based on the binary image data converted by the image binarization means; and developing means for developing the latent image formed by the latent image forming means, with a liquid developer, for forming a toner image.

The present invention also provides an electrophotographic apparatus, as a preferable embodiment of the above, wherein the image binarization means can keep the minimum dot pitch at $\frac{1}{15}$ mm or less.

The present invention also provides an electrophotographic apparatus, as another preferable embodiment of the above, wherein the developing means can develop with a plurality of different color liquid developers.

The present invention also provides an electrophotographic apparatus, as a further other preferable embodiment of the above, further comprising an intermediate transfer member onto which the toner image formed by the developing means is temporarily transferred.

The present invention also provides an electrophotographic method, comprising the steps of converting continuous tone image data into binary image data through the frequency modulation screening method; forming a latent image on a latent image bearing member based on the binary image data thus converted; and developing the formed latent image by a liquid developer.

The present invention also provides an electrophotographic method, as a preferable embodiment of the above, wherein the continuous tone image data are converted into the binary image data by keeping the size of each single dot smaller in the regions low in image area rate than in the regions high in image area rate.

The present invention also provides an electrophotographic method, comprising the steps of converting continuous tone image data into binary image data through the amplitude modulation screening method in the regions small in image area rate, and on the other hand, through the frequency modulation screening method in the regions high in image area rate; forming a latent image on a latent image bearing member based on the binary image data thus converted; and developing the formed latent image with a liquid developer.

The present invention also provides an electrophotographic method, as a preferable embodiment of the above, wherein when the continuous tone image data are converted into the binary image data, the minimum dot pitch is kept at ¹/₁₅ mm or less. The present invention also provides a process for preparing a toner image bearing sheet, comprising the steps of converting continuous tone image data into binary image data through the frequency screening method; forming a latent image based on the binary image data thus converted; developing the formed latent image with a liquid developer, to form a toner image; and fixing the toner image on an image receiving sheet.

The present invention also provides a process for preparing a toner image bearing sheet, comprising the steps of converting continuous tone image data into binary image data through the frequency screening method; forming a latent image on a latent image bearing member based on the binary image data thus converted; developing the formed latent image with a liquid developer, to form a toner image; transferring the toner image onto an image receiving sheet; and fixing the toner image on the image receiving sheet.

The present invention also provides a process for preparing a toner image bearing sheet, as a preferable embodiment of the above, wherein the continuous tone image data are converted into the binary image data by keeping the size of each single dot smaller in the regions low in image area rate than in the regions high in image area rate.

The present invention also provides a process for preparing a toner image bearing sheet, comprising the steps of converting continuous tone image data into binary image data through the amplitude modulation screening method in the regions low in image area rate, and on the other hand, through the frequency screening method in the regions high in image area rate; forming a latent image on a latent image bearing member based on the binary image data thus converted; developing the formed latent image with a liquid developer, to form a toner image; and fixing the toner image on an image receiving sheet.

The present invention also provides a process for preparing a toner image bearing sheet, comprising the steps of converting continuous tone image data into binary image data through the amplitude modulation screening method in the regions low in image area rate, and on the other hand, through the frequency screening method in the regions high in image area rate; forming a latent image on a latent image bearing member based on the binary image data thus converted; developing the formed latent image by a liquid developer, to form a toner image; transferring the toner image onto an image receiving sheet; and fixing the toner image on the image receiving sheet.

The present invention also provides a process for preparing a toner image bearing sheet, comprising the steps of converting continuous tone image data into binary image data through the frequency screening method; forming a latent image on a latent image bearing member based on the binary image data thus converted; developing the formed latent image with a liquid developer, to form a toner image; transferring the toner image onto an intermediate transfer member; transferring the transferred toner image onto an image receiving sheet; and fixing the toner image on the image receiving sheet.

The present invention also provides an electrophotographic apparatus, comprising image binarization means for converting continuous tone image data into binary image data through the frequency modulation screening method; latent image forming means for forming a latent image on a latent image bearing member based on the binary image data by converted by the image binarization means; and developing means for developing the latent image formed by the latent image forming means, with a developer containing toner particles of 7 μm or less in average particle size, for forming a toner image.

The present invention also provides an electrophotographic apparatus, as a preferable embodiment of the above, wherein the image binarization means converts the continuous tone image data into the binary image data by keeping the size of each single dot smaller in the regions low in image area rate than in the regions high in image area rate.

The present invention also provides an electrophotographic apparatus, comprising image binarization means for converting continuous tone image data into binary image data through the amplitude modulation screening method in the regions low in image area rate, and on the other hand, through the frequency modulation screening method in the regions high in image area rate; latent image forming means for forming a latent image on a latent image bearing member based on the binary image data converted by the image binarization means; and developing means for developing the latent image formed by the latent image forming means, with a developer containing toner particles of 7 μm or less in average particle size, for forming a toner image. The present invention also provides an electrophotographic apparatus, as a preferable embodiment of the above, wherein the image binarization means can keep the minimum dot pitch at ¹/₁₅ mm or less.

The present invention also provides an electrophotographic apparatus, as another preferable embodiment of the above, wherein the developing means can develop with a plurality of different color developers.

The present invention also provides an electrophotographic apparatus, as a further other preferable embodiment of the above, wherein the image binarization means converts the binary image data of each color at least after the latent image formation of the previous color, or concurrently with the latent image formation of the previous color.

The present invention also provides an electrophotographic apparatus, as a still further other preferable embodiment of the above, wherein the developing means develops while applying a development bias voltage allowed to be set for each developer.

The present invention also provides an electrophotographic apparatus, as a still further other preferable embodiment of the above, wherein the developing means allows the concentration or electric conductivity of each liquid developer to be set independently.

The present invention also provides an electrophotographic apparatus, as a still further other preferable embodiment of the above, further comprising toner image compressing means for compressing the toner image before fixing.

The present invention also provides an electrophotographic apparatus, as a still further other preferable embodiment of the above, further comprising excess developer removing means for removing the excess liquid developer from the toner image before fixing.

The present invention also provides an electrophotographic apparatus, as a still further other preferable embodiment of the above, wherein the developing means applies the development bias voltage while developing by the developer of the corresponding color, and the excess developer removing means has a surface of a potential between the background area potential and the image area potential of the latent image bearing member, which potential is stabilized to keep its difference from the background area potential smaller than the difference between the development bias voltage and the background area potential.

The present invention also provides an electrophotographic apparatus, as a still further other preferable embodiment of the above, wherein the developing means applies the development bias voltage while developing by the developer of the corresponding color, and the excess developer removing means has a surface of a potential between the background area potential and the image area potential of the latent image bearing member, which potential is stabilized to keep its difference from the background area potential larger than the difference between the development bias voltage and the background area potential.

The present invention also provides an electrophotographic apparatus, as a still further other preferable embodiment of the above, further comprising background toner removing means for removing the toner deposited in the background area of the latent image bearing member.

The present invention also provides an electrophotographic apparatus, as a still further other preferable embodiment of the above, wherein the excess developer removing means removes the excess liquid developer while forming a gap against the latent image bearing member, and further comprising a transfer member capable of being brought into contact with and kept away from the latent image bearing member to have the toner image transferred from the latent image bearing member, and control means for bringing the transfer member into contact with or adjacently to the latent image bearing member after the gap has been flooded with the liquid developer started to be supplied by the developing means to the latent image bearing member.

The present invention also provides an electrophotographic apparatus, as a still further other preferable embodiment of the above, further comprising a plurality of fixing means for fixing the toner image while pressing it to the traveling image receiving sheet, wherein of the plurality of fixing means, the pressure of a fixing means located upstream in the traveling direction of the image receiving sheet is lower than that of a fixing means located downstream.

The present invention also provides an electrophotographic apparatus, as a still further other preferable embodiment of the above, wherein the developing means has a plurality of developing units approaching the latent images one after another in relative movement, for supplying the liquid developers to the latent images, thereby forming the toner images, and the excess developer removing means initiates the excess developer removing action before each of the toner images reaches near the excess developer removing means at the time of changeover between the respective developing units. The present invention also provides an electrophotographic apparatus, as a still further other preferable embodiment of the above, further comprising an intermediate transfer member for receiving the first transfer of the toner image formed by the developing means, toner image second transfer means for secondly transferring the toner image from the intermediate transfer member to the image receiving sheet, cleaning means for cleaning the intermediate transfer member while moving relatively to the intermediate transfer member after completion of the second transfer, and relative movement control means for the cleaning means for lowering the speed of the relative movement for cleaning than that for the first transfer.

The present invention also provides an electrophotographic apparatus, as a still further other preferable embodiment of the above, wherein the developing means has a developing roller moving from the standby position to the developing position, to supply the liquid developer to the latent image, for forming the toner image, and the developing roller is at least partially immersed in the liquid developer during development and is not immersed in the liquid developer when it returns from the developing position to the standby position after forming the toner image.

The present invention also provides an electrophotographic apparatus, as a still further other preferable embodiment of the above, wherein the developing means has a plurality of developing units approaching the latent images one after another in relative movement, for supplying the liquid developers to the latent images, thereby forming the toner images, and further comprising toner image transfer means for transferring the formed toner images from the latent image bearing member to the subsequent transfer member, and transfer control means for controlling the toner image transfer means so that when the changeover region of the latent image bearing member comes to the transfer region, the non-print region of the subsequent transfer member may come to the transfer region.

The present invention also provides an electrophotographic apparatus, as a still further other preferable embodiment of the above, further comprising a mist separator for partially collecting the mist of liquid generated in the apparatus, and a liquid absorptive filter for collecting the remaining mist not collected by the mist separator.

In the electrophotographic apparatus, electrophotographic method, and the process for preparing a toner image bearing sheet of the present invention, a continuous tone image is binarized by using the frequency modulation screening method, and a liquid developer is used for development. Hence, a toner image free from moire, high in relative resolution, and with smooth gray scale reproducibility can be achieved, and a sheet bearing such a toner image can be prepared.

In another version of the electrophotographic apparatus, electrophotographic method, and the process for preparing a toner image bearing sheet of the present invention, in the regions low in image area rate, the amplitude modulation screening method is used for conversion into binary image data, and in the regions high in image area rate, the frequency modulation screening method is used for conversion into binary image data. Hence, a toner image less in the decline of gray scale reproducibility caused by moire and dot gain in the regions high in image area rate and less affected by graininess in the regions low in image area rate can be formed, and a sheet bearing such a toner image can be prepared.

Figures 1, 2:
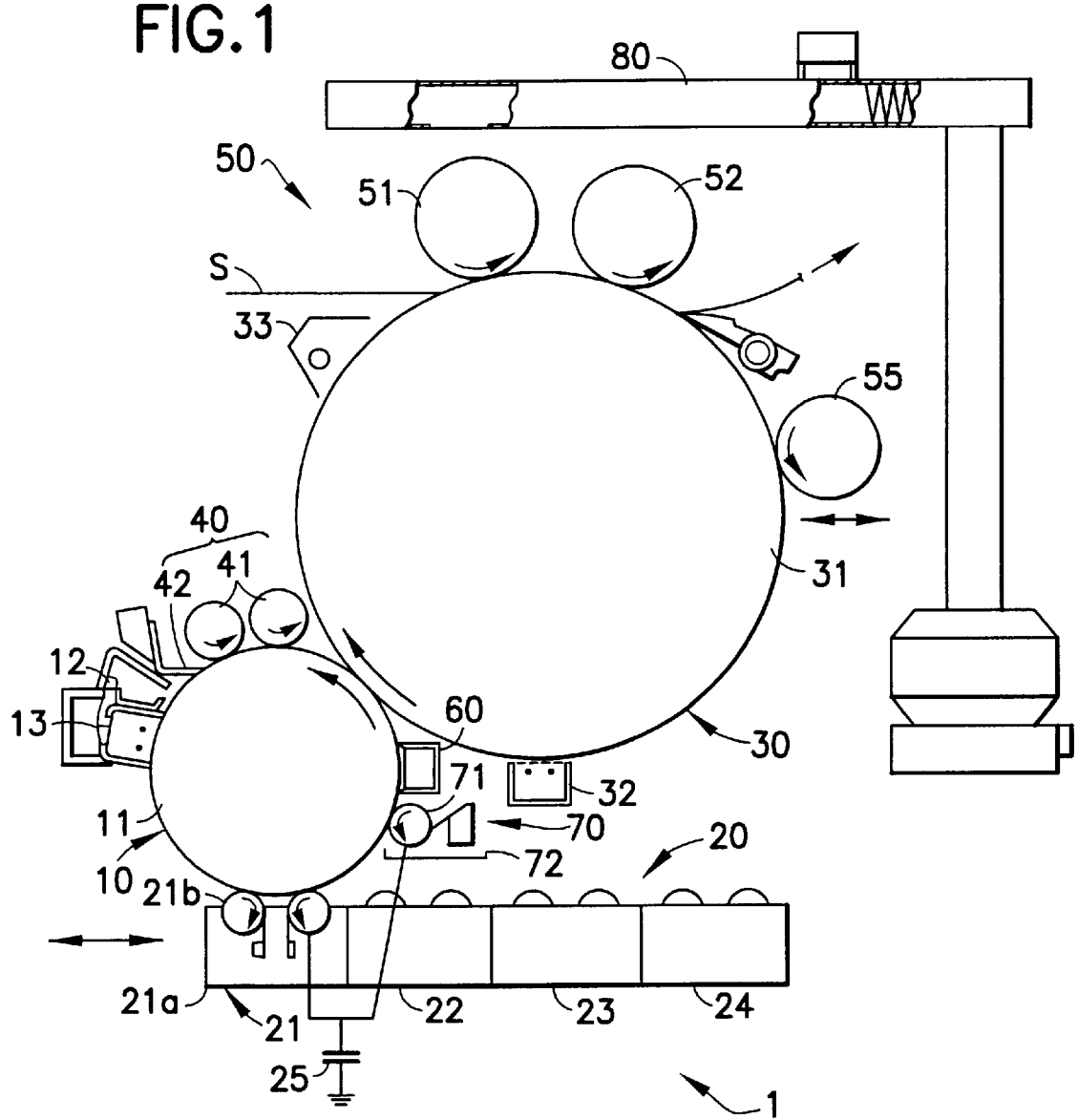
FIG. 1 is a drawing showing, as an embodiment, the configuration of the electrophotographic apparatus of the present invention.
FIG. 2 is a drawing for illustrating, as an example, the principle of the frequency modulation screening method used in the present invention.
Figure 3A:
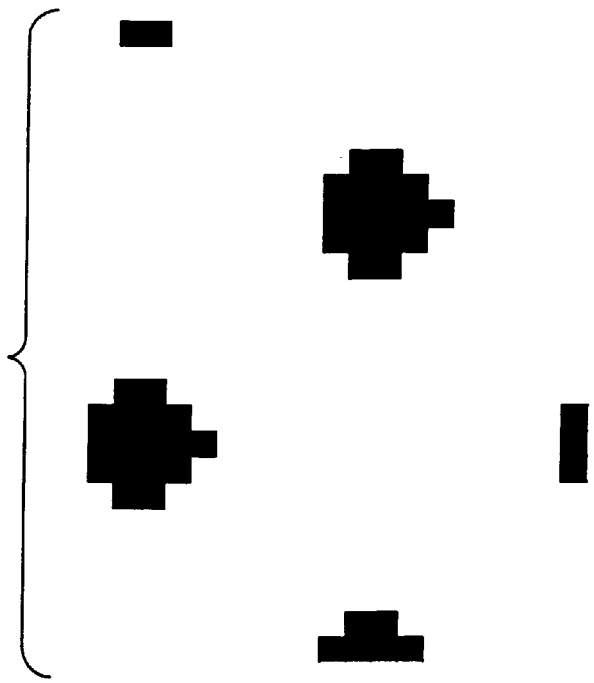
FIG. 3 is model views for comparing the amplitude modulation screening method and the frequency modulation screening method respectively as examples.
Figure 3B:
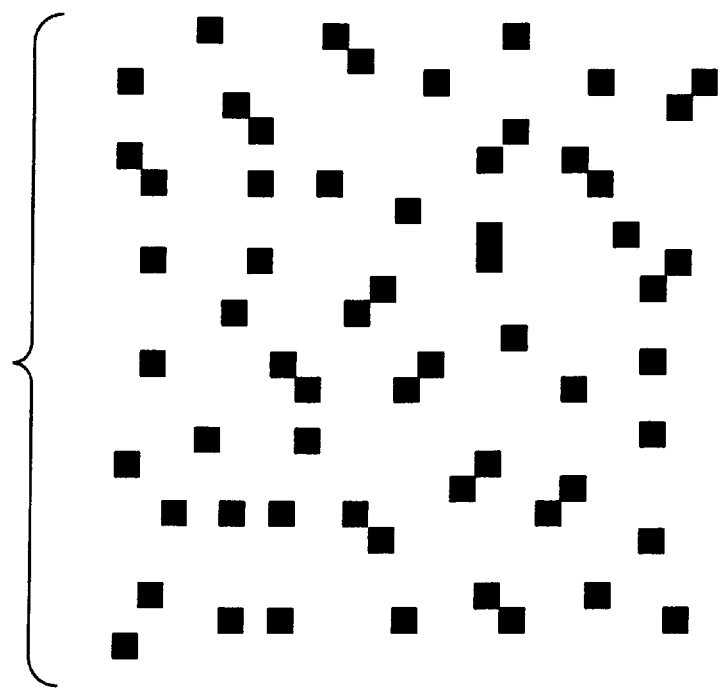

The symbols in the drawing stand for the following:
1: electrophotographic apparatus
10: latent image forming means
11: photosensitive drum
12: neutralizing lamp
13: primary charger
20: developing means
21: first developing unit
21a: developing chamber
21b: developing roller
21c: primary squeegee roller
22: second developing unit
23: third developing unit
24: fourth developing unit
25: capacitor
30: intermediate transfer member
31: intermediate transfer drum
32: charger
33: heater
40: cleaning means
41: cleaning roller
42: squeegee blade
50: transfer-fixing means
51: heating roller
52: heating roller
60: pre-transfer charger
70: subsidiary squeegee means
71: subsidiary squeegee roller
72: tray
80: mist collecting apparatus
81: suction port
82: duct
83: fan
84: mist separator
85: filter
86: exhaust port
87: blower
S: image receiving sheet

MOST PREFERRED EMBODIMENTS OF THE INVENTION

In the electrophotographic apparatus, electrophotographic method, and the process for preparing a toner image bearing sheet of the present invention, when a continuous tone image is binarized, the frequency modulation screening method is used to form a latent image free from moire and high in relative resolution. The latent image thus formed is developed using a liquid developer or a developer containing toner particles of 7 μm or less in average particle size, to form a thin toner layer, for forming a toner image less in the generation of mechanical and optical dot gain. If a liquid developer or a developer containing toner particles of 7 μm or less in average particle size is used, the toner layer can be so thin as to inhibit the generation of dot gain. In particular in the case of a liquid developer, the scattering of toner powder can be prevented also to inhibit the generation of dot gain caused by it.

In a preferable embodiment of the present invention, when a continuous tone image is converted into a binary image, the size of each single dot is kept smaller in the regions low in image area rate than in the regions high in image area rate. This allows the dot pitch to be kept smaller in the regions low in image area rate, to reduce the problem of graininess. In another embodiment of the present invention, in the regions low in image area rate, the amplitude modulation screening method is used for binarizing a continuous tone image, and in the regions high in image area rate, the frequency modulation screening method is used for binarization as in the above embodiment. This allows the halftone dot pitch to be kept within a certain range in the regions low in image area rate where moire is unobtrusive, for reducing the problem of graininess.

In the frequency modulation screening of the present invention, the density of the image is modulated basically by the distance between halftone dots, not by the size of halftone dots. This can be classified into the following subclasses.

(1) Point to point thresholding based techniques
(2) Error diffusion along line by line, and column by column scan (and variation)
(3) Error propagation along Hilbert scan (and variation)
(4) Special technique (screening technique disclosed in West Germany Patent No. 2931092 and U.S. Pat. No. 4,485,397)

These subclasses are described below in detail.

(1) The most typical point to point thresholding based technique is halftoning according to Bayer's dither matrixes. In this technique, the spatial frequency of dots is kept as high as possible, and every halftone dot has a threshold value arranged in a way to be as far away from the halftone dots used for expressing a low density level as possible. The technique is also called dot dispersion type. A halftone dot pattern formed by the Bayer's dither matrixes contains cyclic components and may cause the problem of moire similar to that of the amplitude modulation screening method, but since most of the cyclic components have relatively high frequencies, the generation of subject moire or color moire can be significantly inhibited, compared to the amplitude modulation screening method. The order of threshold values within the dither matrix includes various modifications, but this technique is not limited by any of these modifications. Another point to point thresholding based technique uses "blue noise mask" instead of Bayer's dither matrixes. This is described in U.S. Pat. No. 5,111,310. This blue noise mask is obtained by optimization repetitively carried out in the Fourier transform of threshold matrix. That is, the blue noise mask threshold matrix has halftone dots distributed, and its two-dimensional power spectra are continuous in the regions high in spatial frequency. Hence, this technique can further inhibit the generation of moire observed in the amplitude modulation screening method, compared to the Bayer's dither matrixes.

(2) The most well known techniques in the frequency modulation screening method are the error diffusion techniques. It is intended to keep the error $E_{ij}=I_{ij}-P_{ij}$ between the input signal (density value) Iij and the corresponding pixel recording signal Pij small on the average, and the image is processed from line to line and from column to column. In this process, the error caused as a result of binarization of a continuous tone image is diffused into one or more unprocessed pixels. Several techniques called after the name of each inventor are proposed for how to disperse this error. The Floyd and Steinberg's technique is most famous, but various modifications are also proposed. In a simple modification, pixels are processed according to zigzag sequence. The error diffusion direction is from left to right on even numbered lines and from right to left in odd numbered lines (or vice versa).

A typical error diffusion algorithm is simply described below. For example, for a continuous tone image, in which each pixel has a density value expressed by any value from 0 (white) to 255 (black), whether or not a dot is to be generated is decided by comparison with the set threshold value. If the nth pixel with a density value of 113 is compared with a threshold value (127), no black dot is generated since the density value is smaller than the threshold value. In this case, the error is 113−0 (without dot)=113. If the density value of the n+1-th pixel is 120, this error 113 is added, and 120+113=233 is compared with the threshold value of 127. In this case, a black dot is generated since the density value obtained by adding the error is larger than the threshold value. To the n+2-th pixel, an error of 255 (with dot)−233=22 is brought. This example is the most simple case, and a generated error is distributed to the sole subsequent pixel, but, for example, as shown in FIG. 2, a generated error can be distributed to the adjacent four pixels with weights. That is, the error of a pixel expressed by X is distributed by $7/16$, $3/16$, $5/16$ and $1/16$ respectively to the four pixels located on the right, bottom left, bottom center and bottom right. When an error is distributed to a plurality of pixels, the generation of a texture peculiar to the error diffusion techniques can be preferably inhibited, compared to the case of distributing a generated error to the sole subsequent pixel.

For decreasing the worm like texture occurring at a concentration of about 50% peculiar to the error diffusion techniques, Ulichney proposes a modified error diffusion technique by combining random perturbated weights (Ulichney Robert, "Digital Halftoning", MIT Press Cambridge Mass., 1987, ISBNO-262-21009-6). In this case, an error with one weight selected at random is diffused, that is, the error is distributed only to one unprocessed pixel selected at random in the close neighborhood of the pixel. Furthermore, instead of perturbing the weight, the threshold value to be compared with for binarization can also be perturbed. Moreover, as described in U.S. Pat. No. 5,130,819, the error to be diffused can also be an error averaged for a small region of already processed pixels, instead of the local error at the position of only one pixel.

(3) In the above error diffusion techniques, it is common that the order for processing pixels is linear. That is, the processing order is from left to right or vice versa, or from top to bottom or vice versa. On the contrary, Witten and Neal proposed a method of processing along the path of "Peano curves" by changing the order of pixel processing (Witten Ian H., and Radford M. Neal, "Using Peano Curves for Bilevel Display of Continuous-Tone Images", IEEE CG&A, 47–52p, 1982). Furthermore, as suggested in "Digital Halftoning with Space Filling Curves", Luiz Velho, Jonas de Miran da Gomes, ACM Computer Graphics, vol. 25 (4), 1991, it is also possible to process along another curve such as "Hilbert Curve". All these curves are characteristically "space filling deterministic fractal curves". Moreover, as disclosed in Japanese Patent Laid-Open (Kokai) No. 6-70144, it is also possible to select the order of pixels to be processed, at random, according to a randomized space filling two-dimensional curve. According to this technique, the generation of the texture near 50% concentration can be inhibited. As described above, various orders in processing the pixels of a continuous tone image are also included in the frequency modulation screening method of the present invention.

(4) As a very special technique, a screening technique, in which one continuous tone reproducing matrix is divided into irregularly formed small regions, to equally increase the number of dots in the respective small regions, is disclosed in U.S. Pat. No. 4,485,397, and this technique is also included in the frequency modulation screening method of the present invention.

Furthermore, in the present invention, to reduce the problem of graininess caused by very large pitches of dots when the image area rate is low, either or both of the following methods can be used.

One method is to lessen the size of each single dot in the regions low in image area rate. Concretely, the size of each single pixel in an error diffusion technique (for example, a pixel shown in FIG. 2) is made stepwise smaller according to the image area rate, and within each step, an error diffusion technique is used for binarization, or the respective pixels of Bayer's dither matrixes are similarly made stepwise smaller. When the respective pixels of Bayer's dither matrixes are changed in size, the number of pixels constituting one matrix can be increased in response to the change, or can remain the same.

The second method is to binarize a continuous tone image through the amplitude modulation screening method in the regions low in image area rate, and to binarize through the frequency modulation screening method in the regions high in image area rate. This is similar to the case where pixel size is continuously changed according to the image area rate in the first method. In this case, the modulation method may be changed in reference to whether the image area rate of a certain region is higher or lower than a specific image area rate (say, 5% or 3%). Furthermore, in the process of deciding the locations of halftone dots by the frequency modulation screening, if the pitch between adjacent halftone dots is more than a specific length (say, 0.05 mm, 0.1 mm or 0.3 mm), the dot size may be changed instead of halftone dot pitch, to inhibit the generation of graininess caused by the longer halftone dot pitch. As a further approach, instead of clearly changing the modulation method at a specific border, the concepts of both the frequency modulation screening method and the amplitude modulation screening method may also be combined. For example, it can be practiced for screening, to more frequently modulate according to a method similar to the amplitude modulation in the regions low in image area rate, and to more frequently modulate according to a method similar to the frequency modulation in the regions high in image area rate. Furthermore, it may be practiced that in the regions high in image area rate, the frequency modulation screening is used for binarization, and that in the regions low in image area rate, the binary data are formed to control the dot size of the latent image when the latent image is formed, without changing the dot pitch. When the latent image is formed, for example, in an electrophotographic apparatus to form the latent image by a laser, the spot size of laser beam or exposure time may be changed to modulate the size of a single dot, as so-called dot modulation technique. This is applicable also to the first method.

Irrespective of either of the above methods used, the latent image forming means should be able to reproduce minimum single dots used. Therefore, also in the regions relatively high in image area rate, the image should be able to be binarized by the frequency modulation screening method based on the above minimum single dot pitch, etc. However, even if such a latent image forming means is used, there is a case where the binarization by either of the above methods is advantageous.

That is, the dot gain in the regions relatively high in image area rate can be decreased by enlarging the single dot size, and the storage capacity required for binary image data formation can be decreased.

Furthermore, when latent image forming means as described above is used, the shape of each single dot in the regions high in image area rate is close to an ideal dot shape (i.e., rectangle) on binary image data, and the generation of the dot gain caused by the single dot shape in this case can be inhibited. The reason is described below in reference to a case where the laser beam spot for forming a latent image in a white-black mode development type electrophotographic apparatus is circular and where the single dot shape is square. For example, let us assume a case where a square single dot at a region high in image area rate is a matrix consisting of 2×2 square single dots at regions low in image area rate, hence the length of each side of a single dot at a region high in image area rate is double that at a region low in image area rate. In this case, usually the shape of the laser beam spot, etc. of the latent image forming means is a circle to inscribe or include each square single dot for a region low in image area rate. In this case, to form a single dot for a region high in image area rate, the laser beam spot, etc. is arranged on a matrix of 2×2=4 single dots, for forming the latent image. As a result, the shape of the latent image formed here is closer to a square than the latent image of the single dot formed by a circular laser beam spot, etc. to inscribe the square single dot for a region high in image area rate. The dot gain caused by the single dot shape is thereby lessened. Also when the development type is not the white-black mode development type, the single dot shape becomes preferably close to the ideal shape.

On the other hand, in the comparison between dry electrophotography using a powder developer and wet electrophotography using a liquid developer, the image obtained by wet electrophotography is higher in resolution and good in gray scale reproducibility. This can be explained generally by the following two factors.

(1) The particle size of a wet toner is generally smaller than that of a dry toner.

(2) The charge amount (generally in $\mu C/g$) of a wet toner is large, and so the disturbance of the toner image is unlikely to occur.

Usually, the average particle size of a dry toner is about 10 $\mu$m, while that of a wet toner is as very small as about 0.1 to 5 $\mu$m. When the latent image formed on a latent image bearing member such as a photosensitive member is developed, the difference in toner particle size greatly affects the fineness of the developed toner image. That is, if the toner particle size is smaller, the formed electrostatic latent image can be accurately developed. Moreover, when an electrostatic latent image with the same charge density is developed, a wet toner is less in the deposited amount of toner compared to a dry toner since the charge amount of the wet toner is larger. Furthermore, as can be easily presumed also from the toner particle size, the toner thickness of the wet toner image is very thin, and the toner layer is less mechanically crushed at the time of transfer or fixing, to inhibit the disturbance of the toner image. At the same time, mechanical dot gain can also be inhibited. Furthermore, since the toner layer of the toner image transferred onto the image receiving sheet such as paper is also thin, optical dot gain can also be inhibited.

To obtain the above mentioned characteristics more effectively, the average particle size of the toner is preferably 3 $\mu$m or less.

Figure 4A:
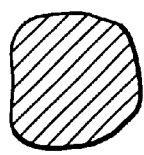
FIG. 4 is model views for comparing a single dot formed in an embodiment of the photographic apparatus of the present invention and a single dot formed in the conventional electrophotographic apparatus (dry).
Figure 4B:
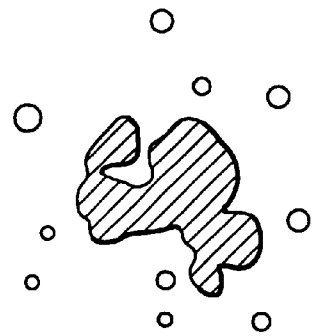

Moreover, in the case of dry electrophotographic process, even if binary image data are converted to form single dots, many toner particles are usually scattered around each dot in the process of development, and are transferred and fixed onto the image receiving sheet (FIG. 4(b)). In consequence, the scattered toner particles may be another cause of dot gain, in addition to mechanical and optical dot gain. In the case of wet process, toner particles are less scattered, and the dot gain caused by them is less generated (FIG. 4(a)).

However, even in dry electrophotographic process, if the average particle size of the toner contained in the developer used is 7 $\mu$m or less, the above problems are decreased, and the effect of combination with the frequency modulation screening may be exhibited. If the average toner particle size is 6 $\mu$m or less, significant improvement can be achieved, and more preferably the average particle size is 3 $\mu$m or less as in the case of wet electrophotography.

Meanwhile, in the present invention, the average particle size of a toner is evaluated as a mean diameter of the volumes of the toner particles dispersed in a liquid, by a known Coulter counter using the particle diameter measuring method of monitoring the electrical current which passes through a small aperture, or by a centrifugal particle analyzer (e.g., SA-CP3 produced by Shimadzu). If both the methods can be used for measurement, the method which can obtain a smaller value should be adopted.

In the present invention, said wet electrophotography, the development method using a developer containing an ultrafine particle toner, and the frequency modulation screening method are used in combination, to avoid various kinds of moire peculiar to the dot amplitude modulation screening method, and to allow very smooth gray scale expression.

In the present invention, an electrophotographic apparatus refers to an apparatus which forms a latent image by static electricity or magnetism, etc., develops it using a toner of 20 $\mu$m or less in average particle size, to form a toner image, and finally fixes the toner image on an image receiving sheet. Furthermore, for the electrophotographic method, various modifications are proposed, and any modification may be used as far as it contains, for example, a process for developing a latent image with toner particles. The latent image is an image where regions different in physical state exist two-dimensionally, and can be, for example, an electrostatic latent image or magnetic latent image, etc.

Furthermore, in the present invention, the latent image bearing member refers to a sheet such as a belt, or a drum which has a surface for bearing said latent image to be developed by a developer including a toner, and which has, on the surface, a photoconductive layer made of a material capable of being conductive when irradiated with light, or which has, on the surface, an insulating layer made of an insulating material. In the case of a latent image bearing member with a photoconductive layer, the area irradiated with light such as laser or LED and the area not irradiated form the image area and the background area respectively. The type in which the non-irradiated area becomes the image area is called black-black mode development, and the type in which the irradiated area becomes the image area is called white-black mode development. In the case of a latent image bearing member with an insulating layer, electrostatic discharge is generated near the insulating layer, to form a latent image. Typical materials of the photoconductive layer include selenium, OPC (organic photoconductor) or amorphous silicon. The latent image bearing member may also be a dielectric used for ionography, etc., or a magnetic recording member used for a magnetic printer such as magnetography.

Moreover, in the present invention, the intermediate transfer member is located at any location between the member for forming the toner image and the image receiving sheet to have the toner image fixed finally, for temporarily holding the toner image.

"The changeover region of the latent image bearing member" refers to a partial region on the surface of the electrostatic latent image bearing member facing the moving developing units, in more detail, refers to a region on the surface of the electrostatic latent image bearing member ranging from the portion in contact with the developing roller immediately before the start of developing unit changeover, to the portion where the developing roller of the next developing unit approaches the electrostatic latent image bearing member and stops to complete the changeover.

In the present invention, the subsequent transfer member refers to a transfer member to have the image directly transferred from the latent image bearing member, being an intermediate transfer member or a transfer member mounted with a recording member such as an image receiving sheet.

Furthermore, the non-print region of the transfer member refers to, for example, a region on the transfer member where the image developed on the electrostatic latent image bearing member is not transferred, or if the transfer member is the intermediate transfer member, it refers to a region where the image on the intermediate transfer member is not transferred onto a recording member such as recording paper, or if a recording member (image receiving sheet) is wound around the transfer medium, it refers to a region on the transfer member where the recording member is not wound. For example, if the recording member (image receiving sheet) is wound around the transfer member, the peripheral length of the transfer drum is set to be longer than the length of the recording member, and the region corresponding to the margin on the transfer drum where the recording member is not wound around is called the non-print region. Furthermore, the region corresponding to the non-print region of the subsequent transfer member is also included in the non-print region referred to here.

In the present invention, the transfer region refers to a vicinity of the region where the transfer of the image from the latent image bearing member to the subsequent transfer member takes place. If the latent image bearing member contacts the subsequent transfer member, the transfer region refers to a vicinity of the tangential line between both, and if both the members are placed to be adjacent to each other, the transfer region refers to a vicinity of the gap between them where the transfer of the toner image takes place.

In the present invention, the binary image data are data for controlling the latent image forming means, and refer to the data on the information whether or not the latent image is formed on the two-dimensional position on the latent image bearing member. For example, they may be provided as a bit map memory where binary data of 1 or 0 is simply written at each 1-bit address. Furthermore, among the various embodiments of the present invention, in an embodiment where the frequency modulation screening method and the amplitude modulation screening method are used in combination, or in an embodiment where the single dot size is changed according to the image area rate, the area rate of the image area in each specific pixel of the latent image bearing member can also be stored, for example, with 2 to 8 bits as one unit.

In the present invention, the minimum dot pitch refers to the minimum distance between adjacently formed dots, and is specified as either of the spatial resolution of latent image forming process or the distance between adjacent minimum unit pixels of binary image data, whichever may be smaller.

In the present invention, a single dot refers to a dot formed in correspondence to the minimum unit pixel of binary image data.

The electrophotographic apparatus of "medium or higher resolution" in the present invention refers to an electrophotographic apparatus with a minimum dot pitch of $1/15$ mm or less. This minimum dot pitch corresponds to 381 dpi (dots per inch). The effects of the present invention are more remarkably presented when the minimum dot pitch is $1/23$ mm or less. If the resolution is higher, the size of one dot is smaller, and the dot area expansion ratio due to the dot gain for one ideal dot area desired to be reproduced tends to be larger. Hence, the effectiveness of the electrophotographic process of using the frequency modulation method and the ultrafine particle toner or liquid developer in combination can be further enhanced.

Furthermore, in a color electrophotographic apparatus using a plurality of color toners, if the dot amplitude modulation screening method is used, the color moire caused by the interference between the grid patterns of halftone dots different in screen angle is generated in addition to the subject moire. That is, the present invention can provide clearer effects in a color electrophotographic apparatus. The wet electrophotography in the present invention is not limited in style or method, as far as a liquid developer, i.e., a developer with toner particles dispersed in an insulating liquid is used. If the toner image formed on the latent image bearing member such as a photosensitive drum or belt is once transferred onto the intermediate transfer member such as a drum or belt, and subsequently transferred onto the image receiving sheet such as paper or film, the wetting of the image receiving sheet by the insulating liquid can be inhibited, to decrease the thermal energy and pressure energy at the time of fixing more preferably. If there is no problem of wetting, an image receiving sheet capable of bearing a latent image (a sheet coated on the surface with a photosensitive layer of zinc oxide, etc.) may be used, and development may be directly effected on it by a liquid developer, to form a toner image which may be directly fixed.

In this case, since the image is not transferred, the generation of dot gain caused by the toner layer crushed by the pressure of transfer can be minimized. Furthermore, in the transfer from the intermediate transfer member onto the final recording member, fixing may be effected simultaneously. The wet electrophotography is less likely to cause dot gain compared to the dry electrophotography as described above, but has causes of dot gain peculiar to it. For example, image drift attributable to an excess liquid developer remaining on the toner image after the development of the latent image with the toner or various kinds of background staining (a phenomenon that toner particles are deposited in the background area, to stain it) may occur. And in the case where the intermediate transfer member is used, the image may be disturbed when it is transferred onto the intermediate transfer member and image disturbance at the transfer of the image onto the image receiving sheet may also occur. In addition, as a common problem with dry electrophotography, insufficient cleaning of the latent image bearing member and the intermediate transfer member may occur. Several means for solving these problems will be described in the latter half of the present specification.

In the present invention, the image receiving sheet may be any sheet onto which the toner image can be transferred, such as paper, plastic film, metallic sheet, raw printing plate for direct imaging, or display sheet, etc. Although many of the sheet gets the toner image transferred directly from the latent image bearing member or through the intermediate transfer member, image receiving sheets on which development can be made, such as a sheet coated with a photosensitive layer of zinc oxide, etc. can be used. Such an image receiving sheet may be used as a printing plate, after fixing of the toner image, and is known as "zinc oxide photosensitive paper for off-set printing" for direct imaging, in the industry.

As an example of raw printing plate for direct imaging, there is a plate with an ink repellent layer such as silicone rubber to allow waterless printing and capable of being used for waterless lithographic printing as disclosed in Japanese Patent Laid-Open (Kokai) No. 57-178893, etc. In the case of raw printing plate for direct imaging used as a printing plate, an aqueous solution called dampening water is given to the background area, and ink is given to the image area made of a material high in affinity to the ink in ordinary printing. Also in this case, at the boundary region between the image area and the background area, an emulsion consisting of ink and dampening water is formed, and the pigment, etc. contained in the ink bleeds out into the emulsion, to generate dot gain. This dot gain occurs in addition to the mechanical dot gain and the optical dot gain. However, in waterless lithographic printing, since silicone rubber, etc. is used instead of dampening water, to repel ink, the above emulsion is not formed, and the effects of the present invention can be maintained also in printing. Many of toners used are mixtures consisting of a pigment, etc. and a resin, etc., but when the image is not recognized by eyesight using the difference in light reflectance, etc. on the surface of the image receiving sheet itself as in the case of the above raw printing plate for direct imaging, etc., the toner itself is not required to be colored.

An embodiment of the present invention is described below in more detail in reference to drawings.

An electrophotographic printer 1 is provided with, as shown in FIG. 1, latent image forming means 10, developing means 20, an intermediate transfer member 30, cleaning means 40, transfer-fixing means 50, a pre-transfer charger 60, subsidiary squeegee means 70, a mist collecting apparatus 80, and image binarization means for continuous tone images not illustrated. The latent image forming means 10 is irradiated with light for exposure by exposure means not illustrated. The exposure means is, for example, a laser scanning exposure system of 800 dpi in resolution (minimum dot pitch approx. ⅓₂ mm). The exposure system can also use an array of LEDs.

The latent image forming means 10 has a photosensitive drum 11, a neutralizing lamp 12 and a primary charger 13, and the photosensitive drum 11 is cleaned on the surface by the cleaning means 40 prior to the removal of residual charge.

In the photosensitive drum 11, a photosensitive layer made of an organic photoconductive material is formed on the surface of a cylindrical drum, to have an electrostatic latent image formed by the light applied by the exposure means. The neutralizing lamp 12 is a small incandescent lamp to apply light to the surface of the photosensitive drum 11, for removing the residual charge. The primary charger 13 is a corona charger for uniformly electrifying the surface of the photosensitive drum 11 by the ions generated by corona discharge.

The developing means 20 has a first developing unit 21 to a fourth developing unit 24, and they are integrally moved by a drive means not illustrated, in the horizontal direction shown in the drawing by an arrow, i.e., in the tangential direction of the photosensitive drum 11. The respective developing units are detachably provided with toner cartridges not illustrated which respectively contain any of liquid developers of yellow, magenta, cyan and black. Each liquid developer is prepared by dispersing toner particles consisting of a yellow, magenta, cyan or black pigment mixed with a resin, into a hydrocarbon solvent such as Isopar G or H (trade name of Exxon Kagaku K. K.) used as a liquid carrier.

In an electrophotographic printer for printing a multi-color toner image, since a plurality of developers are used, it is, needless to say, preferable to prevent the mixing of these developers. In this embodiment, as described below, a primary squeegee roller is arranged for each developing means, and the removed liquid developer is re-used. However, there is only one subsidiary squeegee roller 71 which removes the excess developers from the images of respective color toners developed on the photosensitive drum, and since the removed liquid developers are a mixture of respective colors, they cannot be re-used and cast away. Thus, to avoid waste of liquid developers for economical operation, it is desirable to remove the excess liquid developers from the photosensitive drum before the removal of the liquid developers by the subsidiary squeegee roller 71.

In this embodiment, the excess liquid developers on the surface of the photosensitive drum 11 are minimized, to minimize the mixing of liquid developers and the generation of dot gain. That is, at the time of changeover of respective developing units, the removal of each excess liquid developer is started near the front end of the image developed on the photosensitive member, in the rotation direction of the photosensitive member, or at a position before the front end. In other words, the excess developer removing action is started before the toner image reaches near the squeegee means. Furthermore, the removal of the excess liquid developer is completed at the rear end in the rotating direction of the photosensitive member. As another method, the rotation axis of the primary squeegee roller may be located above that of the corresponding developing roller, or the outer diameter of the primary squeegee roller may be made larger than that of the corresponding developing roller.

That is, in the first developing unit 21 of the developing means 20, in its developing chamber 21a of the liquid developer, a developing roller 21b and a primary squeegee roller 21c are arranged in parallel. Into the developing chamber 21a, the liquid developer is supplied from the toner cartridge arranged in the first developing unit 21. The developing roller 21b and the primary squeegee roller 21c are arranged in parallel to the rotation axis of the photosensitive drum 11 with predetermined distances (h and D) kept against each other in vertical and horizontal directions, when the developing means 20 is in the standby position on the right-hand side of the photosensitive drum 11. The rollers 21b and 21c are vertically movably arranged in the developing chamber 21a and tend to be positioned above due to the action of springs not illustrated, to allow the horizontal movement of the developing means 20. At the time of changeover of developing means 20, the developing roller 21b approaches the photosensitive drum 10, and is pressed down according to the horizontal movement of the developing means 20 (see FIG. 5). Therefore, the primary squeegee roller 21c is placed close to the photosensitive drum at a position higher by a predetermined distance than the developing roller 21b located forward in the moving direction. If the first developing unit 21 is placed at the developing position of the photosensitive drum 11, both the rollers 21b and 21c are placed close to the photosensitive drum 11 with slight gaps kept against it. Since the spacers provided at both the ends of the respective rollers in the axial direction, though not illustrated, contact the photosensitive drum 11, the gaps between the respective rollers and the photosensitive drum 11 are kept constant (say, 50 to 200 μm). Being located with such predetermined small gaps kept is called "being placed close to" in this specification.

Figure 5:
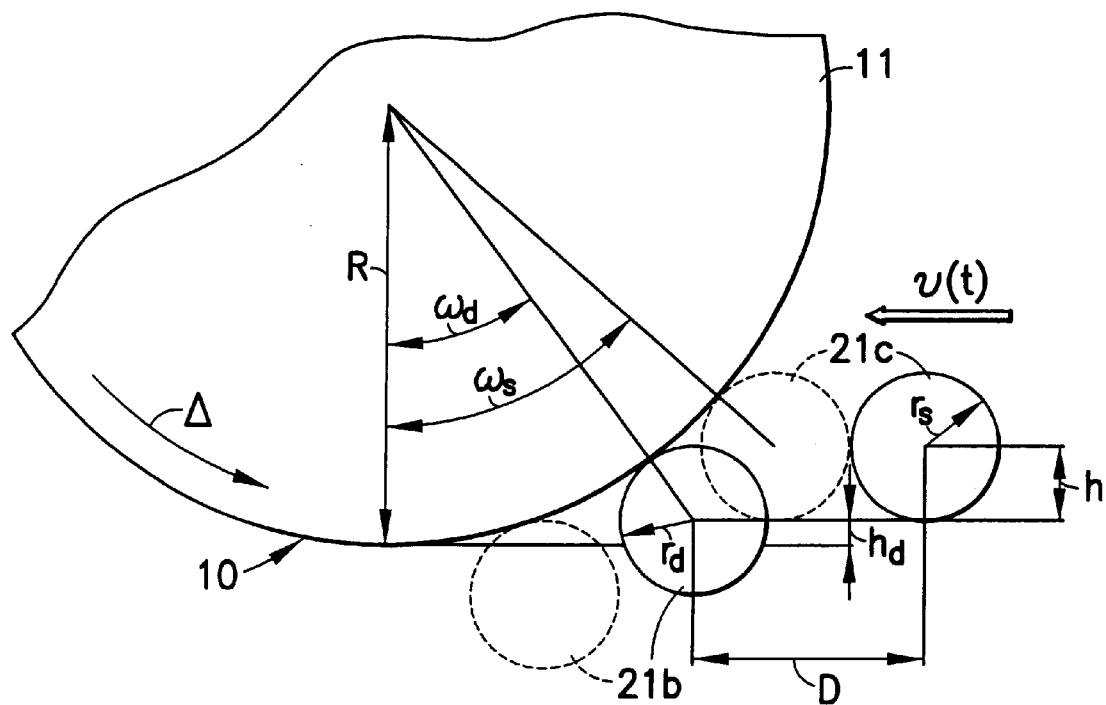
FIG. 5 is a drawing for illustrating the positional relation between the developing roller and the primary squeegee roller of the developing unit in the vertical direction, used in an embodiment of the electrophotographic apparatus of the present invention.

As shown in FIG. 5, if the distance between the center of the developing roller 21b and the center of the primary squeegee roller 21c in vertical direction is h, the moving speed of the developing means 20 for the changeover is v (t), the peripheral speed in the rotation of the photosensitive drum is V, the radius of the photosensitive drum 11 is R, the radius of the developing roller 21b is rd, the radius of the squeegee roller 21c is rs, the distance between the center of the developing roller 21b and the center of the primary squeegee roller 21c in horizontal direction is D, the distance between the central axis of the developing roller 21b in the standby position and the bottom end of the photosensitive drum 11 in vertical direction is hd, the close placed angles of the rollers 21b and 21c to the vertical axis through the center of the photosensitive drum with both the rollers placed close to the photosensitive drum 11 are ωd and ωs, then the close placed angles ωd and ωs of the rollers 21b and 21c are given by the following formulae respectively:

$$\omega d = \cos^{-1}\{(R-hd)/(R+rd)\} \quad (1)$$

$$\omega s = \cos^{-1}\{R-hd-h)/(R+rs)\} \quad (2)$$

Furthermore, if the time taken after the developing roller 21b has been placed close to the photosensitive drum 11 till the primary squeegee roller 21c is placed close to is T, and the rotation angle of the photosensitive drum 11 during the time is θ (radian), then we have θ=VT/R, hence VT=Rθ, where T=D/v (t).

If ωs−ωd>0 is met in this case, the start to remove the excess liquid developer can be expedited, to enhance the removal efficiency. To remove the excess liquid developer as far as possible, it is more desirable to satisfy the condition of ωs−ωd≧θ. That is the center distance h is preferably set to meet the following formula:

$$\cos^{-1}\{(R-hd-h)/(R+rs)\} > VT/R + \cos^{-1}\{(R-hd)/(R+rd)\} \quad (3)$$

The other developing units 22 to 24 are configured like the first developing unit 21. Hence, the corresponding components in the drawing are given the corresponding symbols, to avoid repetitive description.

In the initial position before start of development, the developing means 20 is arranged in the standby position on the right-hand side of the photosensitive drum 11. For development, the developing units 21 to 24 are moved one after another in this order by said drive means toward the latent image forming means 10, and the respective electrostatic latent images formed based on color separated print information are developed one after another as described later, and after completion of development of four colors, they are returned to the standby position.

The respective liquid developers are supplied from the respective toner cartridges to the respective developing units only when the electrophotographic printer 1 is used, and usually the developing chambers of the developing units do not contain the liquid developers.

The primary squeegee rollers 21c are metallic rollers or metallic rollers with a thin film of an insulating synthetic resin or ceramic material formed on the surfaces, and as illustrated, they are electrically connected with the subsidiary squeegee roller 71 of the subsidiary squeegee means 70, electrically floated, and grounded through a capacitor 25. To the primary squeegee rollers 21c and the subsidiary squeegee roller 71, a squeegee bias voltage may also be applied by a power source provided specially for them. The squeegee bias voltage is preferably set at a value not causing background staining in the image obtained and not depriving the image area of the toner when the excess developer is removed. That is, any value between the potential of the background area and the potential of the image area is preferable. Even if the squeegee roller is floated, as far as the potential is in said range, the bias voltage acts to. attract the toner particles deposited on the background area by the attractive force of the electric field, and on the contrary, it can press and compress the toner particles of the image area further to the image area by the repulsive force of the electric field. Background staining is especially harmful since it acts to enhance the optical density higher than the ideal level, like other dot gain, and when the frequency modulation screening is used, keeping the background staining as low as possible gives a preferable result.

The removal of the background staining can be more effectively achieved when the difference between the potential of the squeegee roller and the potential of the background area is larger than the difference between the bias potential of the developing roller and the potential of the background area. In this case, since the potential of the squeegee roller is close to the potential of the image area, the toner particles are more likely to be attracted.

As for the specific values of the potentials, for example, in the white-black mode development type electrophotography, when the surface potential of the background area on the photosensitive drum is set at −600 V while the surface potential of the image area is set at −100V, with a bias voltage of −400 V applied to the developing roller, a bias voltage of −400 V or less in absolute value is applied to the primary or subsidiary squeegee, roller, or it is arranged to keep the potential of the squeegee roller in said range in most cases. When the squeegee roller and the developing roller are set at the same potential, one power source may be used for both the rollers. When the potential difference between the rollers is kept constant, a voltage stabilizer may be inserted between both the rollers.

On the other hand, the compression of the toner image can be achieved more effectively when the difference between the potential of the squeegee roller and the potential of the background area is smaller than the difference between the bias potential of the developing roller and the potential of the background area. In this case, since the potential of the squeegee roller is close to the background area, a stronger repulsive force can act on the toner particles. Thus, the potential of the squeegee roller must be decided against the potential of the developing roller by giving priority to either of the removal of the background staining or the compression of the toner image, but when two sets of squeegee rollers (primary squeegee rollers and subsidiary squeegee roller) are provided as in this embodiment, it can also be arranged to let the upstream squeegee roller sufficiently remove the background staining and to let the downstream squeegee roller compress the toner image. Furthermore, when the bias voltage of the developing roller is between the potential of the image area and the potential of the background area, the background staining may not occur at all, and in this case, also when there is only one squeegee roller, the potential of the squeegee roller can also be made closer to the potential of the background area, to enhance the effect of compressing the toner image. The removal of the background staining or the compression of the toner image is not required to be achieved by the squeegee rollers, and may also be achieved by using a roller stabilized in potential without any squeezing effect or an electrode with static surface. The compression effect can also be achieved by the pre-transfer charger 60 as described later.

In this embodiment, squeegee rollers only are used as means for removing the excess developer, but as another method, air knife effect by blowing air to the surface of the photosensitive drum can also be used, or a heating means by hot air can also be used. In the regions where much excess developer remains, "corona squeezing effect" by a corona discharger such as the pre-transfer charger 60 described later can also be used to dam up the excess developer.

Since the other developing units 22 to 24 are configured like the first developing unit 21, their detailed explanation is avoided here.

The developing means 20 is arranged on the right-hand side of the photosensitive drum 11 in the initial state before start of development, as described before. For development, the developing units 21 to 24 are moved one after another in this order toward the latent image forming means 10 by said drive means, and the respective electrostatic latent images formed based on the binary image data obtained by the color separation and conversion by image binarization means not illustrated are developed one after another.

The image binarization means is means for binarizing the continuous tone image obtained by an image scanner, etc. to allow expression as a toner image. This can be achieved, for example, by incorporating a program for realizing the conversion by the screening method, into an image processing computer, or using a digital signal processor, etc. as hardware.

In the present color electrophotographic printers, the image forming time must be kept as short as possible to control the electric characteristics of the toner particles as accurately as possible. Concretely, after the image data of all the colors have been prepared to complete all the data, the image formation is started. That is, a memory with a capacity to store the image data of all the colors is required. Furthermore, to ensure the desired spatial resolution, the image memory to store the image data becomes very large. For example, even a monochromatic printer of A4 size requires a memory of about 2.0 MB when the spatial resolution is about 400 dpi, and if toners of four colors of yellow, magenta, cyan and black are used for forming a color image, a capacity obtained by multiplying the memory capacity by the number of colors is required, to further increase the required capacity of the memory.

In addition, in a full color electrophotographic printer using dot modulation technology, the memory capacity is further increased. For example, in the case of a printer to store data of 256 levels in gray scale per dot at a spatial resolution of 600 dpi, the required memory capacity is 35 MB which is 8 times that of a two-level gray scale printer of ON and OFF only, and in the case of four colors, an enormous memory capacity of about 140 MB is required.

Such a large memory capacity raises the cost of the recording apparatus remarkably.

In the frequency modulation screening method, as described before, since the relative resolution can be made higher than that of the amplitude modulation screening method, the spatial resolution for reading the image by an image scanner, etc. can be generally kept low, to decrease the image data volume. For example, even when a resolution of 400 dpi is required in the amplitude modulation screening method, the same relative resolution can be achieved, for example, by 200 dpi in the frequency modulation screening method.

Furthermore, when images of respective colors are formed one after another based on image data of the respective colors, to overlap the images of the respective colors, for forming a color image, it is preferable to prepare the image data of each color after or concurrently with the formation of the latent image of the previous color (that is, in the process of forming a latent image of a certain color, the image data of the next color are started to be written into the memory region corresponding to the region with the latent image formation completed; in this case, for example, the latent image formation of the previous color in the latter half and the latent image formation of the next color in the former half take place concurrently). Moreover, it is preferable as in this embodiment, to develop electrostatic latent images on the latent image bearing member, and to transfer the developed images onto the intermediate transfer medium, for overlapping colors on the intermediate transfer medium, and then to record onto the recording member. Furthermore, it is preferable that the latent image bearing member and the intermediate transfer member are kept away from each other in the standby state for image data preparation after completion of latent image formation of the previous color. An image memory with a memory capacity MY of the following formula is sufficient for storing the image data of the respective colors.

$$MX \leq MY \leq MX \times (n-1) \qquad (4)$$

where MX is a memory capacity for one color to cover the maximum image area, and n is the number of colors of image data.

In this case, if the image data of each color are prepared at least after or concurrently with the image formation of the previous color, the memory required for storing the image data of the respective colors can be smaller in capacity.

Furthermore, if the intermediate transfer member is used in this case, it can store the toner image as an intermediate memory, and when a liquid developer is used, the wetting (contact with the solvent) of the image receiving sheet can be minimized. Therefore, even if there is standby time for each color during image formation, a good image free from color deviation can be obtained.

Furthermore, if the photosensitive drum and the intermediate transfer drum are kept away from each other in the standby state for image data preparation after completion of image formation of the previous color, the intermediate transfer member can stand by without disturbing the toner image already formed on the intermediate transfer drum. Moreover, since a charger 32 is used, the electric characteristics of the toner particles can be controlled more accurately, and even if a longer standby time is set between colors, colors can be well overlapped.

Furthermore, if the image data of the respective colors are stored in an image memory with a capacity MY meeting the formula $MX \leq MY \leq MX \times (n-1)$, the preparation of image data and the image formation for the respective colors can be optionally combined within the capacity of the image memory. The binary image data in this embodiment are obtained by converting a continuous tone image either by using the frequency modulation screening method in all the regions, or by using the amplitude modulation screening method in the regions low in background area rate and the frequency modulation screening method in the regions high in background area rate.

In this case, binary information such as character information is not necessarily converted as above.

The intermediate transfer medium 30 is provided with an intermediate transfer drum 31, a charger 32 and a heater 33.

The intermediate transfer drum 31 is pressed against the photosensitive drum 11, to transfer the toner images of respective colors in lamination, when the toner image of each color is developed by any of the developing units 21 to 24 of the developing means 20.

Moreover, in this embodiment, the changeover region of the photosensitive drum 11 is arranged so that it agree with the non-print region of the intermediate transfer drum 31, and then the developed toner image of each color is transferred onto the intermediate transfer drum 31. Thus, for example, the diameters of the photosensitive drum 11 and the intermediate transfer drum 31 are set at the predetermined values by adding the length of the predetermined non-print region to the lengths of the print regions in the rotating direction of the photosensitive drum 11 and the intermediate transfer drum 31 corresponding to the size of the original. Furthermore, preferably, the ratio of the diameter of the photosensitive drum 11 to the diameter of the intermediate transfer drum 31 is set at an integer ratio such as 1:1 or 1:2.

As for the print region and the non-print region, the surface of the latent image bearing member or the intermediate transfer member, etc. is divided into at least two regions, and the region where an image can be formed is called the print region, while the region where any image can never be formed is called the non-print image region. The area where toner particles can be deposited unintentionally belongs to the non-print region.

The intermediate transfer drum 31 and the photosensitive drum 11 can be brought into mutual contact and kept away from each other. Only when a toner image is transferred from the photosensitive drum 11 to the intermediate transfer drum 31, both are brought into mutual contact, and in the other duration, both can be kept away from each other.

In this embodiment, in the transfer of a toner image from the latent image bearing member such as the photosensitive drum onto the subsequent recording member such as the intermediate transfer drum, at the moment when the changeover region of the latent image bearing member reaches the transfer region, the non-print region of the subsequent transfer member reaches the transfer region. As a result, even if excess developer is deposited on the changeover region of the latent image bearing member, it can be prevented that the deposited developer is transferred onto the print region of the subsequent transfer medium and that the developers are mixed. The action to prevent the background staining by this configuration can be exhibited not only in the wet development method but also in the dry development method.

The charger 32 electrifies the intermediate transfer drum 31 according to the same principle as that of the primary charger 13 of the latent image forming means 10, to delete the influence of the previous toner image for allowing easy transfer of the next toner image of a different color to be transferred from the photosensitive drum 11, and to prevent that the toner image already transferred onto the intermediate transfer drum 31 returns onto the photosensitive drum 11.

The heater 33 heats the intermediate transfer drum 31 using a halogen lamp or infrared lamp, etc.

In the intermediate transfer member 30, the toner images developed by the photosensitive drum 11 are transferred onto the intermediate transfer drum 31 one after another in lamination, while being charged by the charger 32. In this transfer, toner images and developers not transferred onto the intermediate transfer drum 31 slightly remain on the photosensitive drum 11, but they are removed by the cleaning means 40.

The cleaning means 40 collects the toner images and developers remaining on the photosensitive drum 11 after completion of transfer of the toner images onto the intermediate transfer drum 31, and has two cleaning rollers 41 kept in contact with the photosensitive drum 11 and a squeegee blade 42 capable of being brought into contact with the photosensitive drum 11. The transfer-fixing means 50 has heating rollers 51 and 52. The heating rollers 51 and 52 contain a heater (not illustrated) respectively. As shown in FIG. 1, on the upstream side in the feed direction of the image receiving sheet S, the heating roller 51 is provided, and on the downstream side, the heating roller 52 is provided, respectively near the intermediate transfer drum 31. For heating and fixing the multi-color toner image onto the image receiving sheet S, the heating rollers 51 and 52 are integrally driven by a pressing mechanism not illustrated, to be pressed against the intermediate transfer drum 31, to heat and press the multi-color toner image for fixing it onto the image receiving sheet S.

When the toner particles are heated and fixed onto paper like this, the liquid carrier deposited onto the paper together with the toner particles is heated into vapor, for dispersion into air. In the present invention, the liquid such as the liquid carrier heated into vapor and their mist are called mist.

The multi-color toner image remaining on the intermediate transfer drum without being transferred by the heating rollers 51 and 52 onto the image receiving sheet S is removed by a cleaning roller 55.

The surface layer of the cleaning roller 55 is made of a material relatively highly capable of releasing the toners, such as mirror-finished chromium plating, and if the surface layer of the intermediate transfer drum 31 is made of a material more highly capable of releasing, such as silicone rubber, the toners-are hard to remain on the intermediate transfer drum.

The cleaning roller 55 contains a heater (not illustrated) and is a metallic roller mirror-finished on the surface, being controlled to 185° C. in surface temperature. The roller 55 rotates at the portion in pressure contact with the intermediate transfer drum 31 in the same circumferential direction at the same peripheral speed as those of the intermediate transfer drum 31. Furthermore, the roller 55 can be driven to be brought into contact with and be kept away from the intermediate transfer drum 31 in the directions shown by arrows in the drawing, by a contact actuator not illustrated, and is brought into pressure contact with the intermediate transfer drum 31 at a predetermined linear pressure (pressure per unit length in the axial direction of the roller). The cleaning roller 55 can clean the intermediate transfer drum 31 at a surface temperature of 80 to 200° C., but for preventing the seizure of the toners by the cleaning roller 55 and allowing easier removal of the toners from the cleaning roller 55, the temperature is preferably about 100 to 190° C.

To collect the mist generated when the toner image is heated and fixed onto the image receiving sheet S, in this embodiment, the mist remaining after collecting the mist by a mist separator is collected by a liquid absorptive filter such as an oil absorptive filter.

The mist separator liquefies, condenses and collects the mist by colliding the mist with a fluid resisting member such as a wire net or wall installed in the mist passage. When a wire net is used, the action is as follows. If the mist particles are large in mass or high in velocity, most of them cannot avoid the lines of the wire net due to their inertia force so that they collide with them, to be liquefied, while many of small particles pass through the meshes along the flow, not being liquefied.

As the mist separator, for example, a folded wire net is used. If the mist is high in flow velocity, mist particles large in particle size cannot avoid the wire net placed as an obstacle since they are especially large in inertia force, and collide with the wire net, to be liquefied and condensed, being collected. On the other hand, mist particles small in particle size pass through the wire net. The mist particles mainly small in particle which are not collected by the mist separator are collected by a liquid absorptive filter such as an oil absorptive filter located downstream of the mist separator. The liquid absorptive filter contains a foam of open cells or closed cells impregnated with an oil absorbable polymer and has its passage sections covered with a fabric such as a nonwoven fabric, woven fabric or knitted fabric. Furthermore, if a filter with an oil absorbable polymer dispersed in it is used as the liquid absorptive filter, the area capable of adsorbing the mist is large, to enhance the mist collection efficiency, since the oil absorbable polymer is dispersed three-dimensionally.

Furthermore, if the mist flow velocity in the mist passage of the mist separator is raised while the mist flow velocity in the mist passage of the oil absorptive filter is lowered on the contrary, the mist collection efficiencies in the respective mist collecting means can be kept high, to allow efficient collection of the mist as a whole. Since large mist particles are collected by the mist separator, the lowering of mist collection efficiency by the oil absorptive filter with the lapse of time due to choking up of the filter can be inhibited.

It is possible to raise the mist flow velocity in the mist passage of the mist separator and to reduce the mist flow velocity in the mist passage of the oil absorptive filter, for example, by keeping the sectional area of the mist passage of the mist separator smaller than that of the oil absorptive filter. Furthermore, it is possible to divide the passage downstream of the mist separator and provide the respective divided passages with oil absorptive filters. In this case, the total sum of the sectional areas of the passages of the plurality of oil absorptive filters is made larger than the sectional area of the passage of the mist separator.

As the liquid absorptive filter, an oil absorptive filter or water absorptive filter can be preferably used. The oil absorptive filter preferably contains a foam of open cells impregnated with an oil absorbable polymer, and has at least one of its sections of the mist passage covered with a nonwoven fabric. In the case of a water absorptive filter, the use of a water absorbable polymer is preferable. The "liquids" include the liquid materials, etc. used in the electrophotographic apparatus such as the developers, etc. used in the wet electrophotographic apparatus, and also solids at room temperature which can be at least once mist in the state of use.

The mist flow velocity in the mist separator is preferably 3 m/s or more. At this velocity, the collection efficiency of relatively large mist particles in the mist separator can be enhanced.

Furthermore, the mist flow velocity in the mist separator is preferably 2 times or more, more preferably 6 times or more of that in the oil absorptive filter. In this case, the mist collection efficiency in the mist separator and that in the oil absorptive filter can be well balanced, to keep the decline of the mist collection rate with the lapse of time in the oil absorptive filter sufficiently small.

Figure 8:
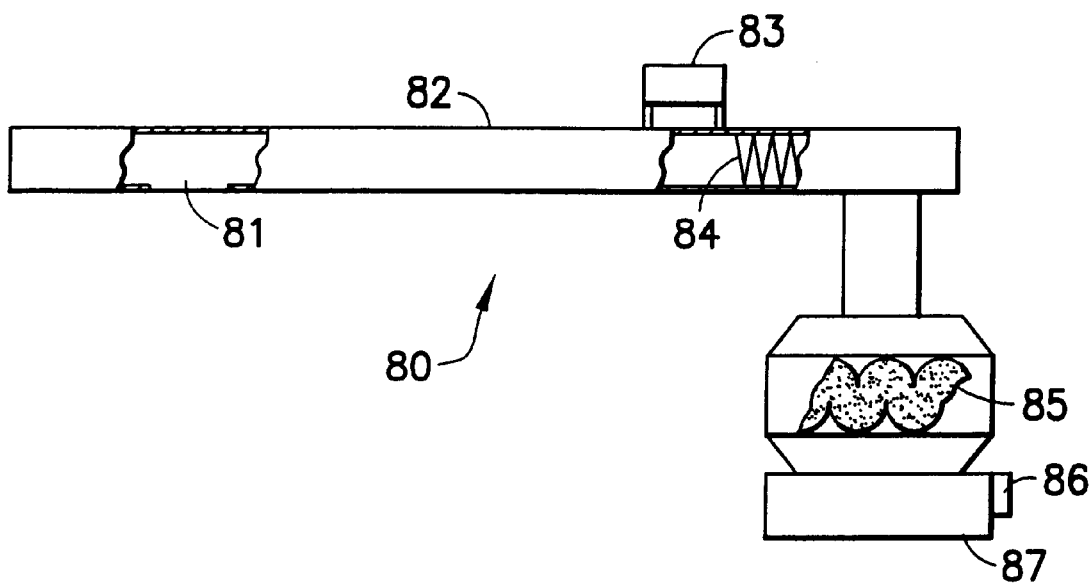
FIG. 8 is a front view showing an embodiment of the mist collecting apparatus, used in an embodiment of the electrophotographic apparatus of the present invention.
Figure 9:
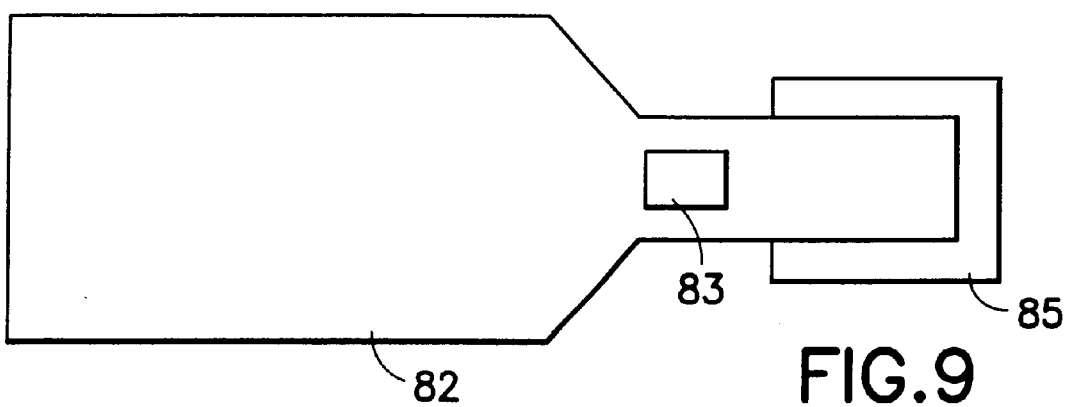
FIG. 9 is a plan view showing an embodiment of the mist collecting apparatus, used in an embodiment of the electrophotographic apparatus of the present invention.

FIGS. 8 and 9 show the detail of the mist collecting apparatus 80 of this embodiment.

In FIG. 8, the apparatus has a blower 87 installed, to suck the generated mist of liquids into a duct 82 through a suction port 81. The sucked mist is preferably cooled by a cooling means 83 such as a fan before it is fed into the mist separator 84. Thus, the liquids are liquefied and likely to be collected by the mist collecting apparatus. Since the sectional area of the passage in the mist separator 84 is small, the mist flow velocity is raised, and in the oil absorptive filter 85, the mist flow velocity is lowered since the sectional area of the passage is larger.

In the apparatus of this embodiment, a wire net with a wire diameter of 0.050 mm and a mesh size of 0.077 mm is folded into six layers, to be used as the mist separator. When the liquid carrier is a hydrocarbon solvent, large mist particles of mainly 1 $\mu$m or more in particle size are especially large in inertia force at a high mist flow velocity, and cannot avoid the wire net installed as an obstacle, colliding with it, and the mist particles colliding with it are liquefied, condensed and collected. On the other hand, small mist particles of mainly 1 $\mu$m or less in particle size pass through the wire net. The mist particles mainly small in particle size which have not been collected by the mist separator are collected by the oil absorptive filter containing a foam of open cells impregnated with an oil absorbable polymer and entirely covered with a nonwoven fabric. In the apparatus of this embodiment, as the foam of open cells, polyurethane foam is used, and as the oil absorbable polymer, granular type higher oil resin Oreosobu PW-170 made of K. K. Nihon Shokubai obtained by flocculating Oreosobu of 30 $\mu$m in average particle size is used.

In the apparatus of this embodiment, if the mist is heated to bout 180° C., the blower is about 30 W in output, the temperature of the mist separator is kept at lower than 30° C. using a cooling means, the mist flow velocity in the mist separator is 3 m/s or more, and the mist flow velocity in the oil absorptive filter is kept at less than one sixth of the mist flow velocity in the mist separator, then the mist collection rate is 80% or more.

Furthermore, the apparatus of this embodiment is preferably operated only for a predetermined period before, during and after the fixing action when the mist is generated, in view of noise and electric power saving, since a blower is used for sucking mist.

The mechanism for pressing the heating rollers 51 and 52 keeps the heating rollers 51 and 52 away from the intermediate transfer drum 31, when the toner image is transferred from the photosensitive drum 11 onto the intermediate transfer drum 31. And by the time when the portion of the intermediate transfer drum 31 where the final toner image of four toner images has been transferred arrives, the pressing mechanism presses the heating rollers 51 and 52 against the intermediate transfer drum 31 at a predetermined pressure. As a result, the heating rollers 51 and 52 press and heat the multi-color toner image transferred in lamination on the intermediate transfer drum 31, onto the image receiving sheet S.

The pre-transfer charger 60 is a corona charger for uniformly electrifying the surface of the photosensitive drum 11 in the same polarity as the toner image, i.e., the toner particles after completion of development. This causes repulsive force to act between the toner image surface and the toner particles, to make the toner particles condensed and hardened on the surface of the photosensitive drum 11. If the liquid carrier remains in a large quantity also near the pre-transfer charger 60 when the removal of the excess developer by the squeegee rollers has been insufficient, it acts also to dam up the excess liquid developer by the so-called "corona squeezing effect". In the present invention, the toner image disturbance inhibiting effect by the pre-transfer charger 60 at the time of transfer is preferable also in view of dot gain inhibition.

The subsidiary squeegee means 70 has a subsidiary squeegee roller 71 and a tray 72. The subsidiary squeegee roller 71 rotates in the tangential direction near the photosensitive drum 11 in the reverse direction, to remove the excess developer, especially the liquid carrier from the surface of the photosensitive drum 11 with the toner images developed. The developer attached to the subsidiary squeegee roller 71 are removed by a scraper and collected in a waste liquid tank through the tray 72 provided below.

In this embodiment, the removal of excess developers by the primary squeegee rollers 21c of the developing means 20 and by the subsidiary squeegee roller 71 of the subsidiary squeegee means 70, and the cohesion of toner particles by the pre-transfer charger 60 are effective to further inhibit the image deterioration such as image drift (this can also cause dot gain) at the time of transfer, and contribute to the preferable dot formation less in dot gain.

The electrophotographic printer 1 of the present invention is composed as described above, and prepares a color image as described below.

At first, from the surface of the photosensitive drum 11 cleaned by the cleaning means 40, the residual charge is removed by the neutralizing lamp 12, and the primary charger 13 uniformly electrifies the surface.

Then, from the exposure means not illustrated, a laser beam is applied, to form electrostatic latent images based on color separated print information, one after another on the surface of the photosensitive drum 11. The electrostatic latent images formed by irradiation with the laser beam are of four colors corresponding to yellow, magenta, cyan and black. The developing means 20 arranged on the right-hand side of the photosensitive drum 11 in the drawing is moved horizontally toward the photosensitive drum 11 by the drive means not illustrated, to develop the yellow toner image by the first developing unit 21, the magenta toner image by the second developing unit 22, and similarly the cyan toner image and the black toner image one after another.

If the densities of the developers are set individually for the respective colors, high color reproducibility can be obtained. For example, in each developer, the solid content (wt %) representing the rate of the toner particles to the carrier and the pigment content (wt %) representing the rate of the weight of the pigment to the weight of the synthetic resin in the toner particles, i.e., two kinds of concentrations are specified at the respective predetermined values. For example, the solid contents (wt %) are set at 2% for yellow, 2.3% for magenta, 1.8% for cyan and 3% for black respectively. Furthermore, the pigment contents (wt %) are set at 15% for cyan, and 20% for the other colors. In this example, the two kinds of concentrations are set for each color, but of course either kind of concentration only can also be specified for each color. The pigment contents are preferably in a range from 5 to 30 wt %, more preferably 9 to 25 wt %, and the solid contents are preferably in a range from 0.5 to 5 wt %, more preferably 1 to 4 wt %. Optimum values are selected for each color.

Furthermore, if the average toner particle size of each liquid developer or the density of the generally used charge control agent is set for each color, the electric conductivity of the developer can be changed for each color. This can be used to control the electric characteristics, so-called development characteristics of toner particles, and to improve color reproducibility. From this point of view, the average toner particle size is preferably in a range from 0.2 to 5 $\mu$m, more preferably 0.3 to 4 $\mu$m, and an optimum value is selected for each color.

The electric conductivity of the developer can be measured, for example, by a method based on the AC conductivity applying an AC electric field between the measuring electrodes, or a method based on the DC conductivity applying a DC voltage between the measuring electrodes. The electric conductivity measured by either method can be an indicator of development characteristics. Concretely, for example, the AC conductivity measuring method can be effected by using Model 627 produced by Scientifica, USA, and the DC conductivity measuring method can be effected by using an apparatus consisting of Model P518 cell electrode produced by Kawaguchi Electrics Works and high resistance meter Model PRB601 produced by Takeda Riken (present Advantest), respectively Tokyo, Japan in combination. Parameters of DC conductivity include the peak current value immediately after applying a voltage, and the base current value after stabilization. Even if either of the values changes, the development characteristics change. Changing any one of the peak values and base values of AC conductivity and DC conductivity enables control of the development characteristics to improve the color reproducibility. Furthermore, it is preferable to set the development bias voltages individually for the developing rollers of respective colors.

In this embodiment, a predetermined development bias voltage is applied from an electrode not illustrated to the developing rollers 21b. For example, it is set at −410 V for the developing unit 21 to develop yellow, −350 V for the developing unit 22 to develop magenta, −380 V for the developing unit 23 to develop cyan and −400 V for the developing unit 24 to develop black, respectively. The above bias voltages can be set by using a power source or a passive voltage stabilizer using Zener diode or variable resistor. To set the bias voltages for the respective colors, a power source can be provided for each color, or one power source can be divided in voltage to allow voltage setting for each color. As a further other method, a power source capable of setting the voltage dynamically can be connected to the electrodes for the respective colors, so that the voltage corresponding to each color can be generated when each of the developing means of the color faces the photosensitive member.

The development bias voltage is set between the bright surface potential of the photosensitive drum 11 exposed to the image in the development region and the dark surface potential not exposed. For example, if the dark (background area in this case) potential is −700 V, and the bright (image area in this case) potential is −100 V, then the development bias voltage is preferably in a range from −600 to −300 V, more preferably −550 V to −250 V. The development bias voltages can be set for the respective colors in this range to achieve almost equivalent densities. Of course the voltages can be the same if there is no problem.

Figure 6A:
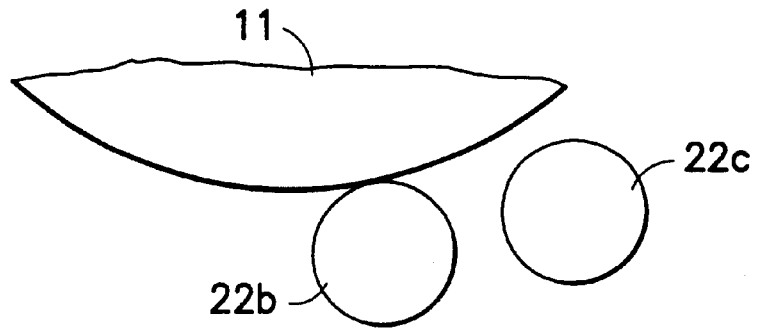
FIG. 6 is an illustration for showing the positional relation among the photosensitive drum, developing roller and primary squeegee roller in the changeover of developing units, used in an embodiment of the electrophotographic apparatus of the present invention.

In the changeover between developing units, for example, when the first developing unit 21 is replaced by the second developing unit 22, as shown in FIG. 6(a), at first the developing roller 22b of the second developing unit 22 contacts the photosensitive drum 11.

Figure 6B:
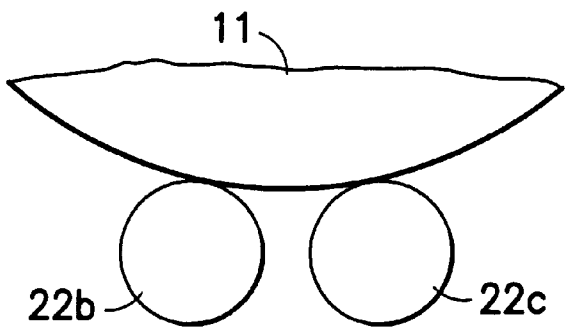

Then, since the developing means 20 is moved further leftward in the drawing, the developing roller 22b moves along the peripheral surface of the photosensitive drum 11, while being pressed down against said spring force. As a result, the first developing unit 21 has been replaced by the second developing unit 22, as shown in FIG. 6(b), so that the developing roller 22b is located in opposite to the primary squeegee roller 22c with respect to the photosensitive drum 11.

During the changeover, the toner image developed by the liquid developer supplied by the developing roller 22b to the photosensitive drum 11 moves counterclockwise due to the rotation of the photosensitive drum 11. In this case, as shown in FIG. 6(a), the developing roller 22b and the primary squeegee roller 22c are positioned with a predetermined distance kept between them in the vertical direction under the condition of ωs−ωd>0.

Thus, the primary squeegee roller 22c contacts the photosensitive drum 11 near the front end of the developed toner image or forward the region in the rotating direction of the photosensitive drum 11, starting to remove the excess liquid developer. At the changeover from the second developing unit to the third developing unit, the primary squeegee roller 22c of the second developing unit is separated from the photosensitive drum 11 after the developing roller 22b is separated from it. That is, the removal of the excess liquid developer ends beyond the rear end of the developed toner image. Therefore, the primary squeegee roller 22c removes the excess liquid developer from the developed toner image on the photosensitive drum 11, and it does not happen that the toner image moves toward the subsidiary squeegee roller 71 without the removal of the excess liquid developer at all. This development occurs also in the other developing units.

Furthermore, the toner image which gets its excess liquid developer removed by the primary squeegee roller 22c has the liquid developer additionally removed by the subsidiary squeegee roller 71, and is transferred onto the intermediate transfer drum 31.

The toner images developed in this way by the respective developing units get their excess liquid developers removed as far as possible before the removal of the liquid developers by the subsidiary squeegee roller 71, and are transferred onto the intermediate transfer drum 31 one after another, to form a multi-color toner image with the four color toner images laminated on the intermediate transfer drum 31.

The effect of this configuration was demonstrated as follows. In the printer of this embodiment, the moving speed v(t) mm/sec of the developing means 20 was set at $$v(t)352 \times t + 42 (0 \leq t \leq 0.25 \text{ second}) = -352 \times t + 218 (0.25 < T \leq 0.5 \text{ second})$$

and with V=160 mm/sec as the peripheral speed of the photosensitive drum 11, R=40 mm as the radius of the photosensitive drum 11, rd=7.5 mm as the radius of developing roller 21b, rs=7.5 mm as the radius of primary squeegee roller 21c, and D=20 mm as the distance between the center of the developing roller 21b and the center of the primary squeegee roller 21c in the horizontal direction, h=3 mm as the distance between the center of the developing roller 21b and the center of the primary squeegee roller 21c in the vertical direction, hd=6.5 mm as the distance between the central axis of the developing roller 21b and the bottom end of the photosensitive drum 11 in the vertical direction, and 40 μm as the gap between the primary squeegee roller 21c and the photosensitive drum 11, a non-image pattern (a pattern only with background areas) was printed. Then, paper was wound around the intermediate transfer drum 31, to measure the amount of the excess liquid developers absorbed by the paper. It was found that the amount was about 40% less compared to the case of setting the distance h as 0 mm.

Figure 7:
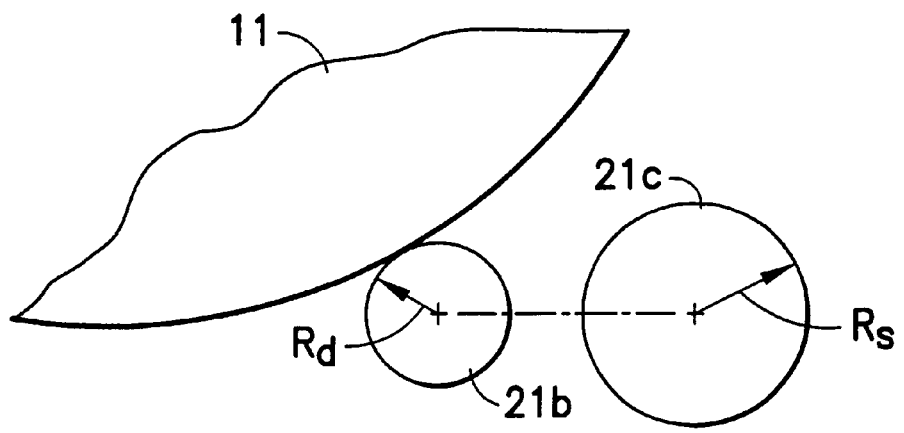
FIG. 7 is an illustration for showing the positional relation among the photosensitive drum, developing roller and primary squeegee roller in the changeover of developing units, used in another embodiment of the electrophotographic apparatus of the present invention.

The developing roller and the primary squeegee roller of each developing unit are not limited in this embodiment, needless to say, as far as the condition of ωs−ωd>0 is met. For example, as shown in FIG. 7, when the distance h between the centers of both the rollers 21b and 21c in the vertical direction is 0, the radius rs of the primary squeegee roller 21c of the developing unit 21 is made larger than the radius rd (<rs) of the developing roller 21b.

At then, if bias voltages are to be applied to the squeegee roller, the developing rollers and the squeegee rollers in the respective developing units are connected to a common power source 25, to have bias voltages of the same polarity applied. In this case, in the electrophotographic printer 1, a single power source 25 can be used to easily control the development bias voltage and the squeegee bias voltage. If it is desired to make both different in potential, a Zener diode, etc. can be connected between them.

In addition, in the photosensitive drum 11 with the toner image developed, when the excess developer is removed by the primary squeegee roller 21c, the toner particles in the toner image can be pressed toward the surface and hardened by electrostatic repulsive force due to the squeegee bias voltage. Therefore, in the electrophotographic printer 1, when the excess developer is removed from the photosensitive drum 11, the developed toner image is held on the photosensitive drum 11, and does not move toward the squeegee roller 21c, to inhibit the generation of dot gain due to image drift, etc., so that the image quality is improved. This is remarkable in the frequency modulation screening method, especially in the combination with the amplitude modulation screening method.

Meanwhile, in the above embodiment, since each developing unit is moved in the tangential direction of the photosensitive drum, to be replaced with the subsequent developing unit, the developing units are located in the standby position apart from the photosensitive drum after completion of printing, etc.

Hence, immediately after turning on the power for start of use, or after the developing units have been kept in the standby state for a long time, the surface of the photosensitive drum 11 is dry, and the gap between the photosensitive drum 11 and the subsidiary squeegee roller 71 is also dry. If the first developing unit 21 is moved to the position of the photosensitive drum 11 in this state to start development, a thin film of the developer supplied at first to the photosensitive drum 11 may pass through the gap against the subsidiary squeegee roller 71 and may be transferred to the intermediate transfer drum 31. As a result, the obtained printed image may be stained on the background by the developer.

Furthermore, in the wet electrophotography, since the transfer rate from the photosensitive member to the intermediate transfer member greatly depends on the amount of the liquid carrier of the transferred image, i.e., the squeezing condition, a problem arises that the development immediately after start of printing forms a region unstable in printing density and image quality.

In this embodiment, in the developing units 21 to 24, the developing rollers and the primary squeegee rollers are rotating. Therefore, in the developing unit 21, the rotation of the developing roller 21b supplies the developer to the photosensitive drum 11, and the portion of the photosensitive drum 11 wetted by the developer rotates toward the subsidiary squeegee means 70. As a result, in the gap between the photosensitive drum 11 and the subsidiary squeegee roller 71, the developer is collected little by little. In the supply of the developer at then, to prevent that the toner particles in the developer migrate to the photosensitive drum 11, it is desirable to apply a potential to the developing roller, to generate attractive electrostatic force on the toner. After the supply of the developer to the photosensitive drum 11 by the developing roller 21b has been started and the photosensitive drum 11 has rotated to fill the gap between the photosensitive drum 11 and the subsidiary squeegee roller 71, the intermediate transfer drum 31 is brought into contact with the photosensitive drum 11 by said drive means (while the toner image is not transferred from the photosensitive drum 11 to the intermediate transfer drum 31, both the drums are basically kept away from each other).

As another method of supplying the developer into the gap between the photosensitive drum 11 and the subsidiary squeegee roller 71, an additional supply means such as a sponge roller may be provided to supply the developer by the supply means instead of the first developing unit 21, or as a further other method, the subsidiary squeegee roller 71 can be arranged to supply the developer using a similar means. The developer supplied by any of these methods is preferably only a liquid carrier to prevent the toner from depositing on the photosensitive drum 11 and the subsidiary squeegee roller 71, and consequently on the intermediate transfer drum 31.

In this case, the developer passing through the gap between the photosensitive drum 11 and the subsidiary squeegee roller 71, after having been supplied to the photosensitive drum 11 till the gap between the photosensitive drum 11 and the subsidiary squeegee roller 71 is filled with the developer, is removed by the cleaning means 40. Therefore, in the developing unit 21, the developing roller 21b is idly rotated prior to the start of the electrostatic latent image formation on the photosensitive drum 11, to prevent the transfer of the developer to the intermediate transfer drum 31 which can cause the background staining.

After the first transfer of the toner images from the photosensitive drum 11 to the intermediate transfer drum 31 has been completed, both the drums are separated from each other, and the rotating speed of the intermediate transfer drum declines to about ⅕.

Subsequently, said pressing mechanism is actuated to press the heating rollers 51 and 52 to the intermediate transfer drum 31. As a result, the multi-color toner image formed in lamination on the intermediate transfer drum 31 is heated and pressed, and transferred and fixed entirely onto the traveling image receiving sheet S, to complete the process of color image recording (second transfer). In this case, to inhibit the deterioration of the photosensitive drum 11 by heat during the transfer and fixing of the toner image onto the image receiving sheet S from the intermediate transfer drum 31, the pressure contact between the intermediate transfer drum 31 and the photosensitive drum 11 is released. And to ensure sufficient transfer and fixing onto the image receiving sheet S, the rotating speed of the intermediate transfer drum 31 is kept lower than the rotating speed of the intermediate transfer drum 31 used for transferring the toner images for the photosensitive drum 11 onto the intermediate transfer drum 31.

Furthermore, when each toner image is transferred from the photosensitive drum 11 to the intermediate transfer drum 31, the changeover region of the photosensitive drum 11 is designed to agree with the non-print region of the intermediate transfer drum 31, for transferring the developed toner image onto the intermediate transfer drum 31. Hence, in the changeover between the respective developing units 21 to 24, even if the developer is deposited on the changeover region of the photosensitive drum 11 by transfer from the developing roller and the squeegee roller, the developer is transferred onto the non-print region of the intermediate transfer drum 31, to inhibit the transfer onto the print region. Furthermore, since the developer transferred onto the non-print region is not transferred or fixed on the image receiving sheet, the generation of background staining on the image receiving sheet can be inhibited. Therefore, the multicolor toner image formed in lamination on the intermediate transfer drum 31 is not stained, and consequently the printed image is not stained, either.

Meanwhile, when the image receiving sheet S approaches the heating rollers, the mist collecting apparatus 80 is powered. In this case, the liquid carrier of the developer heated by the heating rollers 51 and 52 for fixing and deposited on the image receiving sheet S is mostly transformed into mist, and collected by the already operated mist collecting apparatus. At then, the cleaning roller 55 is brought into pressure contact with the intermediate transfer drum 31 at a linear pressure of 11 N/cm after the rotating speed of the intermediate transfer drum 31 has been lowered by the contact actuator not illustrated, and even after the transfer of the multi-color toner image onto the image receiving sheet S has been completed, the intermediate transfer drum 31 is kept in pressure contact with the cleaning roller 55 till the rear end of the print region reaches the pressure contact portion between the cleaning roller 55 and the intermediate transfer drum 31. The pressure of the cleaning roller 55 to the intermediate transfer drum 31 is 6 N/cm or more, preferably 11 N/cm or more in linear pressure, and in this example, it was set at 11 N/cm. Thus, the cleaning roller 55 is kept in contact with the intermediate transfer drum 31 lowered in rotating speed, for a sufficient period of time, to melt the multi-color toner image remaining on the surface of the intermediate transfer drum 31 without being transferred. As a result, the molten remaining multi-color toner image is transferred from the intermediate transfer drum 31 to the cleaning roller 55, to clean the surface.

From the cleaning roller 55 with the remaining multi-color toner image deposited in this way, the remaining multi-color toner image can be removed by such a removing means as a squeegee blade, brush, roller, fleece, etc.

In the above configuration, since the rotating speed (surface linear speed) of the intermediate transfer drum is lowered at the cleaning than that at the first transfer, the intermediate transfer drum cleaning efficiency can be raised, and the damage of the intermediate transfer drum can be reduced. In addition, since the transfer of the image from the intermediate transfer drum to the subsequent recording member and the cleaning are effected concurrently as described above, an effect equivalent that obtained by heating the intermediate transfer drum can be obtained, to further enhance the cleaning efficiency. Moreover, additional heating of the intermediate transfer drum may have a good results.

Since the toner remaining on the intermediate transfer drum is reliably removed by cleaning in this way, the background staining by the remaining toner can be inhibited.

Furthermore, since the peripheral speed of the cleaning roller 55 is set to be equal to the peripheral speed of the intermediate transfer drum 31, any sliding in the rotating direction occurs at all, and no cleaning failure occurs.

Furthermore, since they are equal in peripheral speed, the cleaning roller 55 does not give any significant stress to the intermediate transfer drum 31 in the rotating direction, to inhibit the deterioration of the intermediate transfer drum 31.

Meanwhile, in the transfer from the intermediate transfer drum 31 to the image receiving sheet S, a phenomenon of image drift that the image is deformed to trail downstream (a kind of dot gain) can happen. This image drift occurs not only in a wet electrophotographic apparatus but also in a dry electrophotographic apparatus. The cause of the image drift is considered to be an excessive mechanical stress acting on the image when the non-fixed toner image is heated, pressed and fixed, and it can occur not only with an apparatus which performs transfer and thermal fixing simultaneously, but also with an apparatus which compresses the non-fixed toner image by a pressure means after transfer. The image drift is especially harmful when the frequency modulation screening is used.

Therefore, in this embodiment, the pressures of the heating rollers onto the intermediate transfer drum (toner image bearing member) are determined to be lower in upstream position than in downstream position. As a result, the upstream heating roller 51 can slightly transfer-fix the toner image on to the image receiving sheet S at a small pressure without applying any excessive stress on the toner image.

Hence, even if the downstream heating roller 52 transfers and fixes the toner image at a higher pressure, the image drift is hard to occur with a less chance of giving an excessive stress to the non-fixed toner image, since the toner image is slightly fixed onto the image receiving sheet S. Thus, the dot gain due to the image drift caused in the step of fixing can be inhibited.

Specifically it is preferable, for example, that the pressure of the upstream heating roller 51 is P1=3 to 15 N/cm per unit length in the roller axis direction, and that the pressure of the downstream heating roller 52 is P2=5 to 25 N/cm subject to the condition that P2 is larger than P1. The difference between both the pressures is preferably 4 to 20 N/cm.

When the recording of the multi-color toner image onto the image receiving sheet S is completed as described above, the pressure contact of the heating rollers 51 and 52 with the intermediate transfer drum 31 by the pressing mechanism is released, and the pressure contact of the cleaning roller 55 with the intermediate transfer drum 31 by said contact actuator is also released. Then, the developing means 20 is moved to the initial position on the right-hand side of the photosensitive drum 11 by said drive means.

Then, the respective pumps not illustrated which supply the liquid developers to the developing chambers of the respective developing units stop, thus the supply of the developers into the developing chambers of the developing units 21 to 24 stops. As a result, in the developing units 21 to 24, the developers in the respective developing chambers flow back into the respective toner cartridges due to the action of gravity through the ports provided at the bottoms of the developing chambers, causing the liquid levels to decline gradually. This back flow can also be helped by pumps, etc. After said stop of the pumps, when a predetermined time has passed to allow the levels of the developers decline below the bottoms of the respective developing rollers, the developing rollers and squeegee rollers of the developing units 21 to 24 stop. Through the rotation of the developing rollers and the squeegee rollers for a predetermined time, the developers remaining on the surfaces of these rollers can be removed by said blades.

In this manner the developing rollers are kept away from the liquid developers like this when the developing units are returned to the standby position after completion of development so that even if the liquid developers remain on the developing rollers and the squeegee rollers of the developing units 21 to 24, they are electrostatically attracted to these rollers by the bias voltages. It is thus prevented that the photosensitive drum 11 is stained by the deposited liquid developers, and that the liquid developers are contaminated due to the mixing between the developing units. In addition, since the pressure contact between the intermediate transfer drum 31 and the photosensitive drum 11 is released, even if the photosensitive drum 11 is stained by the liquid developers, it can be prevented that the staining on the photosensitive drum 11 migrates onto the intermediate transfer drum 31.

EXAMPLES

Example 1

The above electrophotographic printer 1 was used to print a continuous tone image onto image receiving sheets. Four kinds of liquid developers containing any of toners of 0.5 $\mu$m, 1 $\mu$m, 2 $\mu$m and 3 $\mu$m in average particle size and 0.05 to 10 $\mu$m in particle size distribution range (measured by centrifugal precipitation using SA-CP3 produced by Shimadzu) were used for development respectively. The image receiving sheets used were paper, plastic film, and said raw printing plate for direct imaging. As the image binarization means, the method using the Bayer dither matrix and the error diffusion technique shown in FIG. 2 were used. The minimum dot pitch was controlled by the image binarization process to prepare data of 1/15 mm, 1/23 mm and 1/30 mm for printing.

In every case, the printed images were free from the subject moire and the color moire and could realize very smooth gray scale reproduction, being less affected by the dot gain. The thickness of the toner layer after fixing was about 3 $\mu$m as a single layer on the average when the toner used was 2 $\mu$m or less in average particle size, and about 5 $\mu$m when the toner used was 3 $\mu$m in average particle size. As a result, when the average particle size was 2 $\mu$m or less, the influence of dot gain was less.

Single dots with toner particles scattered around them as shown in FIG. 4($a$) were little observed. When the minimum dot pitch was 1/30 mm, the single dot size viewed in the direction perpendicular to the surface of the image receiving sheet is ideally about 45 $\mu$m in diameter, but in this example, it became 50 $\mu$m, to show that the mechanical dot gain could be kept at about 10%. Since the thickness of the toner layer was also thin as stated above, the overall dot gain including the optical dot gain was also very small.

EXAMPLE 2

In Example 1, when the minimum dot pitch was smaller, the formed toner image was more affected by the dot gain. On the other hand, when the minimum dot pitch was 1/15 mm, some graininess was observed. Accordingly, in the regions high in image area rate, binarization was effected using an error diffusion technique with the minimum dot pitch as 1/15 mm, and in the regions where the dot pitches exceed 0.1 mm according to this method, a minimum dot pitch of 1/30 mm was adopted for binarization. This made the graininess less conspicuous, and the dot gain was decreased compared with a case where a minimum dot pitch of 1/30 mm was adopted irrespective of the image area rate.

COMPARATIVE EXAMPLE

In a dry electrophotographic apparatus, a dry developer containing a toner relatively small in particle size as a toner available for dry type (average particle size 8 $\mu$m, measured by the particle diameter measuring method of monitoring the electric current which passes through a small aperture, using a Coulter counter) was used for development, to print on image receiving sheets (paper). As the image binarization means, an error diffusion technique was used, and the minimum dot pitch was set at $\frac{1}{24}$ mm.

The thickness of the toner layer on an image receiving sheet after fixing was 15 μm as a single layer, and the formed single dots had toner particles scattered around them as shown in FIG. 4(b). The single dot size viewed in the direction perpendicular to the surface of the image receiving sheet is ideally about 60 μm in diameter, but in this comparative example, the dots formed as shown in FIG. 4(b) were about more than 80 μm even though it was difficult to state the value since the dots formed as shown in FIG. 4(b) could never be called circles. The mechanical dot gain exceeded 30-odd %. Therefore the overall dot gain including the optical dot gain, etc. was very large, and in the regions low in image area rate, the optical density sharply rose. In the regions of more than about 50% in image area rate, the optical density was much higher than the ideal level, and in the regions of more than 80%, the optical density reached almost its full extent.

Industrial Applicability

The present invention provides an electrophotographic apparatus and electrophotographic method which are less affected by dot gain and able to realize smooth gray scale expression, high gray scale reproducibility, and are hard to generate moire. It also provides a toner image bearing sheet in which mechanical and optical dot gain are less generated.

What is claimed is:

1. An electrophotographic apparatus comprising image binarization means for converting continuous tone image data into binary image data through a frequency modulation screening method; latent image forming means for forming a latent image on a latent image bearing member based on the binary image data converted by the image binarization means; and developing means for developing the latent image formed by the latent image forming means, with a liquid developer, for forming a toner image, wherein the image binarization means converts the continuous tone image data into the binary image data by keeping the size of each single dot smaller in the regions low in image area rate than in the regions high in image area rate.

2. An electrophotographic apparatus according to claim 1, wherein the developing means can develop with a plurality of different color developers.

3. An electrophotographic apparatus according to claim 2, wherein the image binarization means converts the binary image data of each color at least after the latent image formation of the previous color, or concurrently with the latent image formation of the previous color.

4. An electrophotographic apparatus according to claim 2, wherein the developing means develops while applying a development bias voltage allowed to be set for each developer.

5. An electrophotographic apparatus according to claim 1, wherein the developing means allows the concentration or electric conductivity of each liquid developer to be set independently.

6. An electrophotographic apparatus, comprising image binarization means for converting continuous tone image data into binary image data through an amplitude modulation screening method in the regions low in image area rate, and on the other hand, through a frequency modulation screening method in the regions high in image area rate; latent image forming means for forming a latent image on a latent image bearing member based on the binary image data converted by the image binarization means; and developing means for developing the latent image formed by the latent image forming means, with a liquid developer, for forming a toner image.

7. An electrophotographic apparatus according to claim 6, wherein the image binarization means can keep the minimum dot pitch at $\frac{1}{15}$ mm or less.

8. An electrophotographic apparatus according to claim 7, wherein the developing means can develop with a plurality of different color liquid developers.

9. An electrophotographic apparatus according to claim 7, further comprising an intermediate transfer member onto which the toner image formed by the developing means is temporarily transferred.

10. An electrophotographic apparatus according to claim 6, wherein the developing means can develop with a plurality of different color liquid developers.

11. An electrophotographic apparatus according to claim 10, wherein the image binarization means converts the binary image data of each color at least after the latent image formation of the previous color, or concurrently with the latent image formation of the previous color.

12. An electrophotographic apparatus according to claim 10, wherein the developing means develops while applying a development bias voltage allowed to be set for each developer.

13. An electrophotographic apparatus according to claim 10, further comprising an intermediate transfer member onto which the toner image formed by the developing means is temporarily transferred.

14. An electrophotographic apparatus according to claim 6, further comprising an intermediate transfer member onto which the toner image formed by the developing means is temporarily transferred.

15. An electrophotographic apparatus according to claim 6, further comprising a toner image compressing means for compressing the toner image before fixing.

16. An electrophotographic apparatus according to claim 6, further comprising an excess developer removing means for removing the excess liquid developer from the toner image before fixing.

17. An electrophotographic apparatus according to claim 16, wherein the developing means applies the development bias voltage while developing by the developer of the corresponding color, and the excess developer removing means has a surface of a potential between the background area potential and the image area potential of the latent image bearing member, which potential is stabilized to keep its difference from the background area potential smaller than the difference between the development bias voltage and the background area potential.

18. An electrophotographic apparatus according to claim 16, wherein the developing means applies the development bias voltage while developing by the developer of the corresponding color, and the excess developer removing means has a surface of a potential between the background area potential and the image area potential of the latent image bearing member, which potential is stabilized to keep its difference from the background area potential larger than the difference between the development bias voltage and the background area potential.

19. An electrophotographic apparatus according to claim 16, wherein the excess developer removing means removes the excess liquid developer while forming a gap against the latent image bearing member, and further comprising a transfer member capable of being brought into contact with and kept away from the latent image bearing member to have the toner image transferred from the latent image bearing member, and control means for bringing the transfer member into contact with or adjacently to the latent image bearing member after the gap has been flooded with the liquid developer started to be supplied by the developing means to the latent image bearing member.

20. An electrophotographic apparatus according to claim 16, wherein the developing means has a plurality of developing units approaching the latent images one after another in relative movement, for supplying the liquid developers to the latent images, thereby forming the toner images, and the excess developer removing means initiates the excess developer removing action before each of the toner images reaches near the excess developer removing means at the time of changeover between the respective developing units.

21. An electrophotographic apparatus according to claim 6, further comprising background toner removing means for removing the toner deposited in the background area of the latent image bearing member.

22. An electrophotographic apparatus according to claim 6, further comprising a plurality of fixing means for fixing the toner image while pressing it to a traveling image receiving sheet, wherein pressure between one of the fixing means located upstream in the traveling direction of the traveling image receiving sheet and the traveling image receiving sheet is lower than pressure between one of the fixing means located downstream in the traveling direction of the traveling image receiving sheet and the traveling image receiving sheet.

23. An electrophotographic apparatus according to claim 6, further comprising an intermediate transfer member for receiving the first transfer of the toner image formed by the developing means, toner image second transfer means for secondly transferring the toner image from the intermediate transfer member to an image receiving sheet, cleaning means for cleaning the intermediate transfer member while moving relatively to the intermediate transfer member after completion of the second transfer, control means for controlling a speed of the relative to maintain so that the speed of the relative-movement is lower than a speed of the intermediate transfer member at the first transfer.

24. An electrophotographic apparatus according to claim 6, wherein the developing means has a developing roller moving from a standby position to a developing position, to supply the liquid developer to the latent image, for forming the toner image, and the developing roller is at least partially immersed in the liquid developer during development and is not immersed in the liquid developer when it returns from the developing position to the standby position after forming the toner image.

25. An electrophotographic apparatus according to claim 6, wherein the developing means has a plurality of developing units approaching the latent images one after another in relative movement, for supplying the liquid developers to the latent images, thereby forming the toner images, and further comprising toner image transfer means for transferring the formed toner images from the latent image bearing member to the subsequent transfer member, and transfer control means for controlling the toner image transfer means so that when the changeover region of the latent image bearing member comes to the transfer region, the non-print region of the subsequent transfer member may come to the transfer region.

26. An electrophotographic apparatus according to claim 6, further comprising a mist separator for partially collecting the mist of liquid generated in the apparatus, and a liquid absorptive filter for collecting the remaining mist not collected by the mist separator.

27. An electrophotographic method comprising the steps of converting continuous tone image data into binary image data through a frequency modulation screening method; forming a latent image on a latent image bearing member based on the binary image data thus converted; and developing the formed latent image by a liquid developer, wherein the continuous tone image data are converted into the binary image data by keeping the size of each single dot smaller in the regions low in image area rate than in the regions high in image area rate.

28. An electrophotographic method, comprising the steps of converting continuous tone image data into binary image data through an amplitude modulation screening method in the regions small in image area rate, and on the other hand, through a frequency modulation screening method in the regions high in image area rate; forming a latent image on a latent image bearing member based on the binary image data thus converted; and developing the formed latent image with a liquid developer.

29. An electrophotographic method according to claim 28, wherein when the continuous tone image data are converted into the binary image data, the minimum dot pitch-is kept at $1/15$ mm or less.

30. A process for preparing a toner image bearing sheet comprising the steps of converting continuous tone image data into binary image data through a frequency modulation screening method; forming a latent image based on the binary data thus converted; developing the formed latent image with a liquid developer to form a toner image; and fixing the toner image on an image receiving sheet, wherein the continuous tone image data are converted into the binary image data by keeping the size of each single dot smaller in the regions low in image area rate than in the regions high in image area rate.

31. A process for preparing a toner image bearing sheet, comprising the steps of converting continuous tone image data into binary image data through an amplitude modulation screening method in the regions low in image area rate, and on the other hand, through a frequency modulation screening method in the regions high in image area rate; forming a latent image on a latent image bearing member based on the binary image data thus converted; developing the formed latent image with a liquid developer, to form a toner image; and fixing the toner image on an image receiving sheet.

32. A process for preparing a toner image bearing sheet according claim 31, wherein when the continuous tone image data are converted into the binary image data, the minimum dot pitch is kept at $1/15$ mm or less.

33. A process for preparing a toner image bearing sheet, comprising the steps of converting continuous tone image data into binary image data through an amplitude modulation screening method in the regions low in image area rate, and on the other hand, through a frequency modulation screening method in the regions high in image area rate; forming a latent image on a latent image bearing member based on the binary image data thus converted; developing the formed latent image with a liquid developer, to form a toner image; transferring the toner image onto an image receiving sheet; and fixing the rate than in the regions high in image area rate.

34. A process for preparing a toner image bearing sheet according claim 33, wherein when the continuous tone image data are converted into the binary image data, the minimum dot pitch is kept at $1/15$ mm or less.

35. An electrophotographic apparatus comprising image binarization means for converting continuous tone image data into binary image data through a frequency modulation screening method; latent image forming means for forming a latent image on a latent image bearing member based on the binary image data converted by the image binarization means; and developing means for developing the latent image formed by the latent image forming means, with a developer containing toner particles of 7 μm or less in average particle size, for forming a toner image, wherein the image binarization means converts the continuous tone image data into the binary image data by keeping the size of each single dot smaller in the regions low in image area rate than in the regions high in image area rate.

36. An electrophotographic apparatus according to claim 35 wherein the image binarization means can keep the minimum dot pitch at ⅟15 mm or less.

37. An electrophotographic apparatus according to claim 36, wherein the developing means can develop with a plurality of different color developers.

38. An electrophotographic apparatus, comprising image binarization means for converting continuous tone image data into binary image data through an amplitude modulation screening method in the regions low in image area rate, and on the other hand, through a frequency modulation screening method in the regions high in image area rate; latent image forming means for forming a latent image on a latent image bearing member based on the binary image data converted by the image binarization means; and developing means for developing the latent image formed by the latent image forming means, with a developer containing toner particles of 7 μm or less in average particle size, for forming a toner image.

39. An electrophotographic apparatus according to claim 38, wherein the developing means can develop with a plurality of different color developers.

40. An electrophotographic apparatus according to claim 39, wherein the image binarization means converts the binary image data of each color at least after the latent image formation of the previous color, or concurrently with the latent image formation of the previous color.

41. An electrophotographic apparatus according to claim 39, wherein the developing means develops while applying a development bias voltage allowed to be set for each developer.

42. A process for preparing a toner image bearing sheet, comprising the steps of converting continuous tone image data into binary image data through a frequency modulation screening method; forming a latent image on a latent image bearing member based on the binary image data thus converted; developing the formed latent image with a liquid developer, to form a toner image; transferring the toner image onto an image receiving sheet; and fixing the toner image on an image receiving sheet, wherein the continuous tone image data are converted into the binary image data by keeping the size of each single dot smaller in the regions low in image area rate than in the regions high in image area rate.

* * * * *